US012776725B2

(12) United States Patent
Viitanen et al.

(10) Patent No.: US 12,776,725 B2
(45) Date of Patent: Oct. 27, 2026

(54) ARRANGEMENT FOR CURRENT SHARING OF PARALLEL-CONNECTED CONVERTERS

(71) Applicant: ABB Schweiz AG, Baden (CH)

(72) Inventors: Tero Viitanen, Helsinki (FI); Veli-Matti Leppänen, Helsinki (FI); Peter Muszynski, Helsinki (FI)

(73) Assignee: ABB SCHWEIZ AG, Baden (CH)

( * ) Notice: Subject to any disclaimer, the term of this patent is extended or adjusted under 35 U.S.C. 154(b) by 168 days.

(21) Appl. No.: 18/746,133

(22) Filed: Jun. 18, 2024

(65) Prior Publication Data

US 2024/0429833 A1 Dec. 26, 2024

(30) Foreign Application Priority Data

Jun. 21, 2023 (EP) .................................... 23180670

(51) Int. Cl.

*H02M 7/493* (2007.01)
*H02J 1/10* (2006.01)
*H02M 7/5395* (2006.01)

(52) U.S. Cl.

CPC ............. *H02M 7/493* (2013.01); *H02J 1/106* (2020.01); *H02M 7/5395* (2013.01)

(58) Field of Classification Search

CPC ....... H02M 7/493; H02M 7/5395; H02J 1/106
See application file for complete search history.

(56) References Cited

U.S. PATENT DOCUMENTS 5,047,913 A 9/1991 De Doncker et al.
5,892,673 A * 4/1999 Delgado ............... H02M 7/538 363/138
7,068,525 B2 6/2006 Kraus et al.
8,432,714 B2 4/2013 Keronen et al.
(Continued)

FOREIGN PATENT DOCUMENTS

EP 524398 A2 1/1993
WO 2017079125 A1 5/2017

OTHER PUBLICATIONS (ARCPI) Operation Using online voltage measurement; IEEE Applied Power Electronics Conference and Exposition (APEC); Mar. 20, 2022; 6 Pages.
(Continued)

*Primary Examiner* — Gary L Laxton
(74) *Attorney, Agent, or Firm* — Greenberg Traurig, LLP

(57) ABSTRACT

Current sharing between the plurality of parallel-connected ARCP or hard-switching converter legs is balanced by a control arrangement. The control arrangement senses a leg output current in each of the parallel-connected converter legs and have an individual autonomous leg-specific switching instant adjustment for the main switches of each of the parallel-connected converter legs to shift the first mode A commutation of the respective converter leg later in time and to shift the second mode B commutation of the respective converter leg earlier in time by a variable timestep proportional to the value of the sensed leg current of the respective converter leg. In other words, if the value of the sensed leg
(Continued)

output current in one converter leg is larger than in the other converter leg, then in mode A, the higher-current leg will commutate later than the leg with less current, and in mode B, the higher-current leg will commutate earlier than the leg with less current.

19 Claims, 8 Drawing Sheets

(56) References Cited

U.S. PATENT DOCUMENTS

2014/0204643 A1* 7/2014 Wagoner ............... H02M 7/493
363/132
2016/0211771 A1* 7/2016 Ichihara .................. H02M 1/08
2017/0373609 A1* 12/2017 Perreault ............... H02M 1/083
2020/0036298 A1* 1/2020 Starzinger ........... H02M 7/5387

OTHER PUBLICATIONS

Extended European Search Report; Application No. 23180670.4; Completed: Nov. 22, 2023; Mailing date: Dec. 4, 2023; 10 Pages.

* cited by examiner

Fig. 5A
Fig. 5B
Fig. 5C
Fig. 5D
Fig. 5E
Fig. 5F
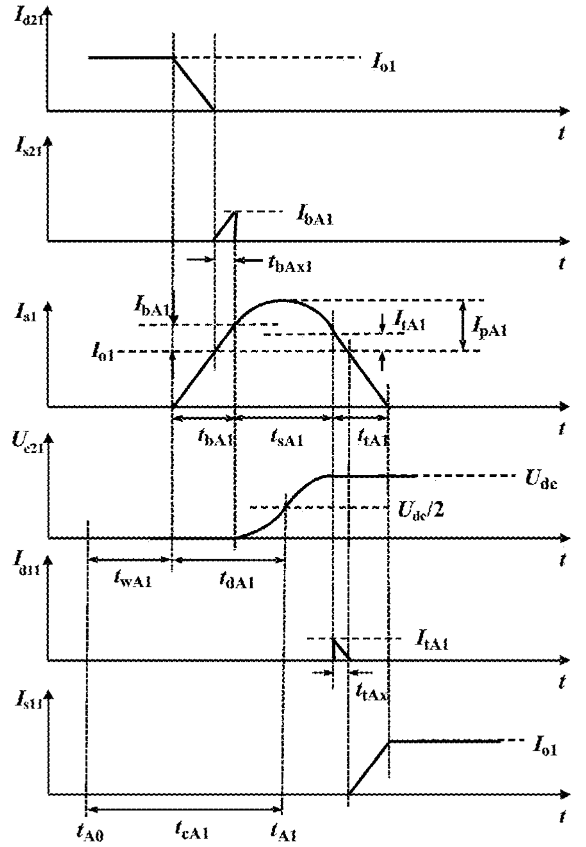
Fig. 6A
Fig. 6B
Fig. 6C
Fig. 6D
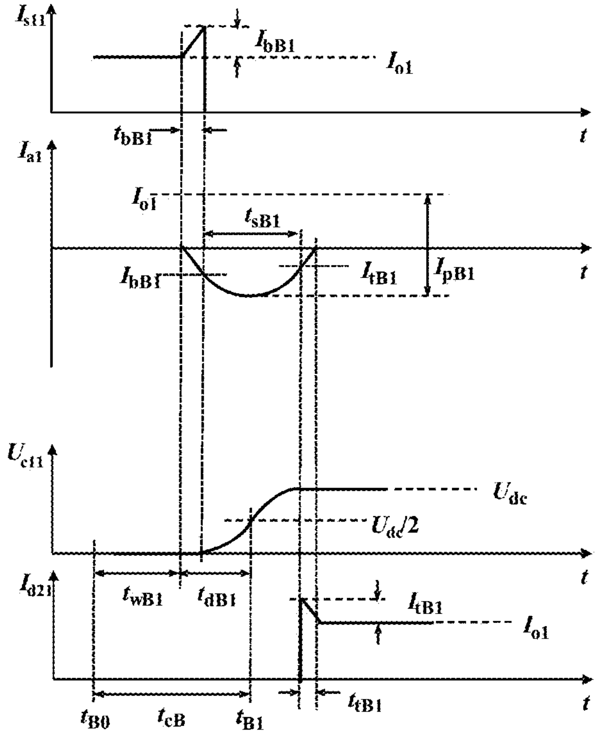

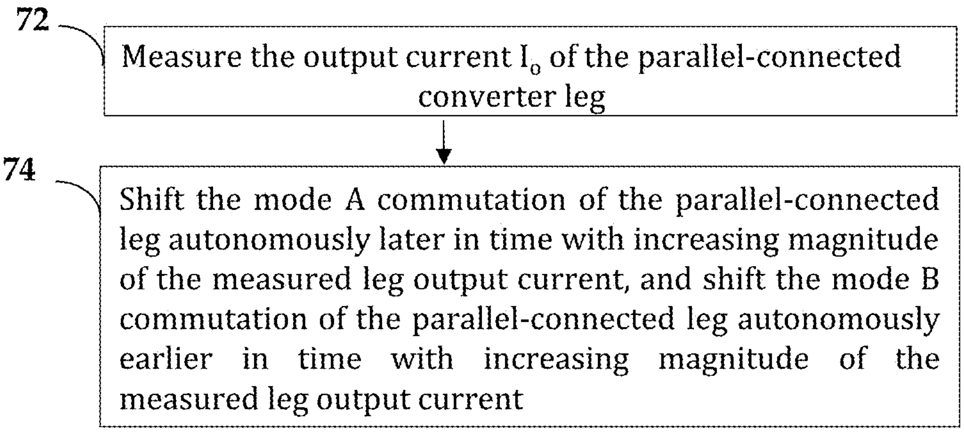
Fig. 7
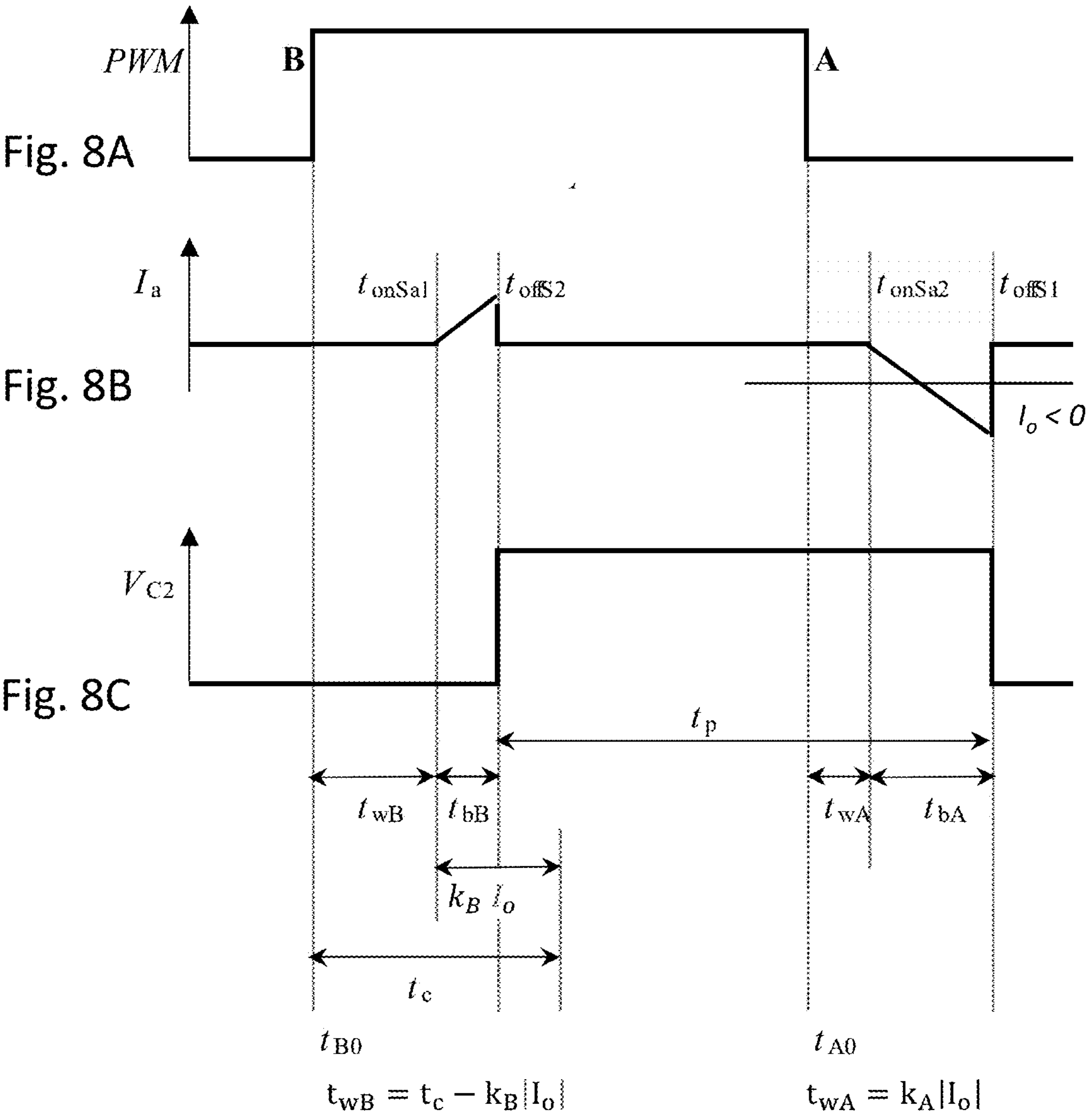
Fig. 8A
Fig. 8B
Fig. 8C

ARRANGEMENT FOR CURRENT SHARING OF PARALLEL-CONNECTED CONVERTERS

TECHNICAL FIELD

The present invention relates to parallel-connected power converters and more particularly to a current sharing of parallel-connected power inverters and rectifiers.

BACKGROUND

A dc-ac or ac-dc converter, also known as an inverter or a rectifier respectively, converts power from dc to ac or ac to dc system at desired voltages and frequencies. The inverter therefore can be operated as an adjustable-frequency voltage source. The dc power input to the inverter may be obtained from an existing power supply network through a rectifier or from a battery, fuel cell, photovoltaic array, etc. The filter capacitor(s) across the input terminals of the inverter provides a fairly constant dc-link voltage. A configuration of ac to dc rectifier and dc to ac inverter may be called a dc-link converter.

In some situations, a power inverter with an increased output power capability is implemented by connecting a plurality of inverter units in parallel with one another to feed the same load. The parallel-connected inverter units may receive simultaneous and similar control signals to provide a desired output of the power inverter. However, due to parameter differences of switch components and differing impedances in parallel branches, the currents between the units can be unequal in magnitude. Such a current imbalance can stress the components unevenly and wear switch components with higher current prematurely. A higher current in a switch component can result in a higher dissipated power and, further, a higher temperature of the component.

Current imbalance has been addressed by modifying switch control pulses in order to balance the currents. The control pulses can be modified by delaying a turn-on time instant for a switch that has the highest current or by delaying turn-off time instants for a switch that has the smallest current. One such method is disclosed in EP0524398. In these solutions, the conducting times of the parallel components are modified to equalize stresses to the switch components on the basis of measured inverter unit currents.

U.S. Pat. No. 8,432,714 discloses a method for balancing load between parallel-connected inverter modules wherein temperatures of each output leg of each inverter module are determined and the switching instructions for one or more of the parallel inverter modules are modified for controlling the temperatures of the output legs.

WO2017/079125A1 discloses a method wherein the output voltages of all the parallel connected power devices are measured, and the measuring results are used for mitigating timing differences during output voltage state changes caused e.g. by gate driver circuit and switching component parameter tolerances.

U.S. Pat. No. 7,068,525 discloses a method of operating multiple parallel-connected inverters by regulating the individual currents of the inverters separately.

SUMMARY

An object of the present invention is to provide an improved power converter system having two or more parallel-connected converter legs. The power converter system is recited in the independent claim. Preferred embodiments are disclosed in the dependent claims.

An aspect of the invention is a power converter system, comprising

- two or more converter legs connected in parallel between a common dc system and a common ac system or between two common dc systems, wherein each of said converter legs comprises a first controllable main switching device with a first antiparallel diode and a second controllable switching device with a second antiparallel diode connected in series between a first DC voltage rail and a second DC voltage rail to alternatively connect the first and second dc-link rails to a converter leg output or input,
- wherein each parallel-connected converter leg comprises a mode A of commutation wherein a leg current commutates from the first or second antiparallel diode to the second or first controllable main switching device, respectively, and a mode B of commutation wherein the leg current commutates from the first or second controllable main switching device to the second or first antiparallel diode, respectively,
- wherein commutations of the parallel-connected converter legs are initiated by essentially simultaneous commutation commands,
- a control arrangement configured to sense the leg current in each of the parallel-connected inverter legs, and wherein the control arrangement is configured to balance a current sharing between the parallel-connected inverter legs by means of having an individual autonomous leg-specific switching instant adjustment for the main switches of each of the parallel-connected converter legs to shift the mode A commutation of the respective converter leg later in time and to shift the mode B commutation of the respective converter leg earlier in time by a variable timestep proportional to the value of the sensed leg current of the respective converter leg.

In an embodiment, each individual autonomous leg-specific switching instant adjustment is configured to shift a start of a leg voltage swing during the mode A commutation of the respective converter leg later in time and to shift a start of a leg voltage swing during the mode B commutation of the respective converter leg earlier in time by a variable timestep proportional to the value of the sensed leg current of the respective converter leg.

In an embodiment, the size of the variable timestep of an individual shift later in time during an individual mode A commutation and the size of the variable timestep of an individual shift earlier in time during an individual mode B commutation are configured to be dependent on the value of the sensed leg current of the respective converter leg in such a way that the size of the variable timestep of individual shift in time increases with the increasing value of the sensed leg current and decreases with the decreasing value of the sensed leg current.

In an embodiment, each individual autonomous leg-specific switching instant adjustment of the main switching devices has a first predetermined dependence on the value of the sensed leg current of the respective converter leg in mode A commutation and a second predetermined dependence in the mode B commutation, and wherein optionally the predetermined first and second dependences of different parallel-connected converter legs having different nominal leg current ratings are selected to scale the current sharing between the between the parallel-connected converter legs according to nominal leg currents of the parallel-connected converter legs.

In an embodiment, the parallel-connected converter legs are auxiliary resonant commutated pole (ARCP) converter legs, particularly ARCP half-bridge legs, and wherein the control arrangement is configured to advance each ARCP mode B commutation sequence and delay each ARCP mode A commutation sequence in time in such a way that the size of the variable timestep increases with the increasing value of the sensed leg current and decreases with the decreasing value of the sensed leg current-of the respective converter leg.

In an embodiment, the ARCP commutation sequence includes a sequence from a turn-on instant of at least one auxiliary switching device to a turn-off instant of the main switching device that has been conducting.

In an embodiment, the control arrangement is configured to delay both the turn-on instance of the at least one auxiliary switching device and the turn-off instant of the main switching device in the mode A commutation by a first variable timestep $t_{wA}$ which increases with the increasing value of the sensed leg current and decreases with the decreasing value of the sensed leg current of the respective converter leg, and the control arrangement is configured to delay both the turn-on instance of the at least one auxiliary switching device and the turn-off instant of the main switching device in the mode B commutation by a second variable timestep $t_{wB}$ which decreases with the increasing value of the sensed leg current and increases with the decreasing value of the sensed leg current of the respective converter leg, thereby advancing the turn-off instant of the main switching device proportionally to the value of the sensed leg current.

In an embodiment, the control arrangement is configured to delay the turn-off instant of the main switching device in the mode A commutation by adding the first variable timestep $t_{wA}$ to a reference turn-off instant of the main switching device, and wherein the control arrangement is configured to advance the turn-off instant of the main switching device in the mode B commutation by adding the second variable timestep $t_{wB}$ to a reference turn-off instant of the main switching device.

In an embodiment, the first variable timestep is $t_{wA}=k_A|I_o|$, where $I_o$ is the value of the sensed leg current sample of the respective converter leg, and $k_A$ is a constant, $k_A$ being equal for all converter legs with equal nominal leg current ratings, and the second variable timestep is $t_{wB}=t_c-k_B|I_o|$, where $t_{wB}\geq 0$, $I_o$ is the value of the sensed leg current sample of the respective converter leg, $t_c$ is a constant time, and $k_B$ is a constant, $k_B$ being equal for all converter legs with equal nominal leg current ratings.

In an embodiment, the parallel-connected converter legs have different nominal leg current ratings, and wherein the constants $k_A$ and/or $k_B$ in the parallel-connected converter legs are selected to scale with nominal leg currents of the converter legs such that a product of the constant $k_A$ and the nominal leg current $I_N$ is same in all parallel-connected converter legs and a product of the constant $k_B$ and the nominal leg current $I_N$ is essentially same in all parallel-connected converter legs.

In an embodiment, the parallel connected converter legs are hard-switching converter legs, particularly half-bridge legs, and wherein the control arrangement is configured to delay a turn-off instant of the main switching device that has been conducting in the mode B commutation by a first variable timestep $t_{d,off}$ which decreases with the increasing value of the sensed leg current and increases with the decreasing value of the sensed leg current of the respective converter leg, and the control arrangement is configured to delay a turn-on instant of the main switching device that will start conducting in the mode A commutation by a second variable timestep $t_{d,on}$ which increases with the increasing value of the sensed leg current and decreases with the decreasing value of the sensed leg current of the respective converter leg.

In an embodiment, the first variable timestep $t_{d,off}$ decreases with the increasing value of the sensed leg current according to $k_{off}*|I_o|$, where $I_o$ is the value of the sensed leg current of the respective converter leg and $k_B$ is a constant, $k_B$ being equal for all converter legs with equal nominal leg current ratings, and the second variable timestep $t_{d,on}$ increases with the increasing value of the sensed leg current according to $k_{on}*|I_o|$, where Io is the value of the sensed leg current of the respective converter leg, and $k_{on}$ is a constant, $k_{on}$ being equal for all converter legs with equal nominal leg current ratings.

In an embodiment, the first variable timestep is $t_{d,off}=t_c-k_{off}|I_o|$, where $t_c$ is a constant time defining an adjustment range, and wherein the second variable timestep is $t_{d,on}=t_D+k_{on}|I_o|$, where, $t_D$ is an optional constant turn-on delay to avoid simultaneously conducting main switch devices.

In an embodiment, the parallel connected converter legs have different nominal leg current ratings, and wherein the constants $k_{on}$ or $k_{off}$ in the parallel-connected connector legs are selected to scale with nominal leg currents of the converter legs such that a product of the constant $k_{on}$ and the nominal leg current $I_N$ is same in all parallel-connected converter legs and a product of the constant $k_{off}$ and the nominal leg current $I_N$ is same in all parallel-connected converter legs.

In an embodiment, the control arrangement comprises a leg-specific controller for each of the two or more parallel-connected converter legs to adjust the switching instants of the main switching devices.

In an embodiment, the power inverter system comprises two or more converters, each of the converters comprising one or more converter phase legs, wherein the parallel-connected converter legs are the corresponding converter phase legs of the two or more converters connected in parallel.

In an embodiment, the control arrangement comprises converter-specific switching controllers for the two or more converters, each of the converter-specific switching controllers being configured to provide the autonomous adjustment of switching instants for each of the converter phase legs of the respective converter.

BRIEF DESCRIPTION OF THE DRAWINGS

In the following the invention will be described in greater detail by means of exemplary embodiments with reference to the attached drawings, in which

FIGS. 5A-5F are diagrams illustrating an example of mode A commutation;

FIGS. 6A-6D are diagrams illustrating an example of mode B commutation;

FIG. 7 is a flow diagram illustrating an exemplary operation of the control arrangement according to an aspect of the invention;

FIGS. 8A-8C are timing diagrams illustrating an example of shifting switching instants in a single converter leg;

DETAILED DESCRIPTION

A dc-ac or ac-dc converter, also known as an inverter or a rectifier respectively, converts power from dc to ac or ac to dc power system at desired voltages and frequencies. Further, a dc-dc converter, such as a dc chopper, converts power from dc to dc power system. Although embodiments are described using inverters and inverter systems as examples, the invention is similarly applicable to rectifiers and rectifier systems as well as dc-dc converters. Inverter and rectifier can be exactly similar in structure and the control operations can be similar, the difference being the direction of a power flow. When a converter operates as an inverter (dc/ac converter), it converts the power from a dc system to an ac system, i.e., the ac side of the converter is referred as an output side and the dc side is considered as an input side. When a converter operates as a rectifier (ac/dc converter), it converts power from an ac system to a dc system, i.e., the ac side of the converter is considered as an input side and the dc side is considered as an output side. Further, connecting ac/dc and dc/dc converters in back-to-back configuration, i.e. dc-sides connected together, between two ac systems, one of the converters is operating in rectifier mode and the other in inverter mode, depending on the power flow direction. Operation modes of the converters may vary during the operation, as power flow may vary.

Figure 1:
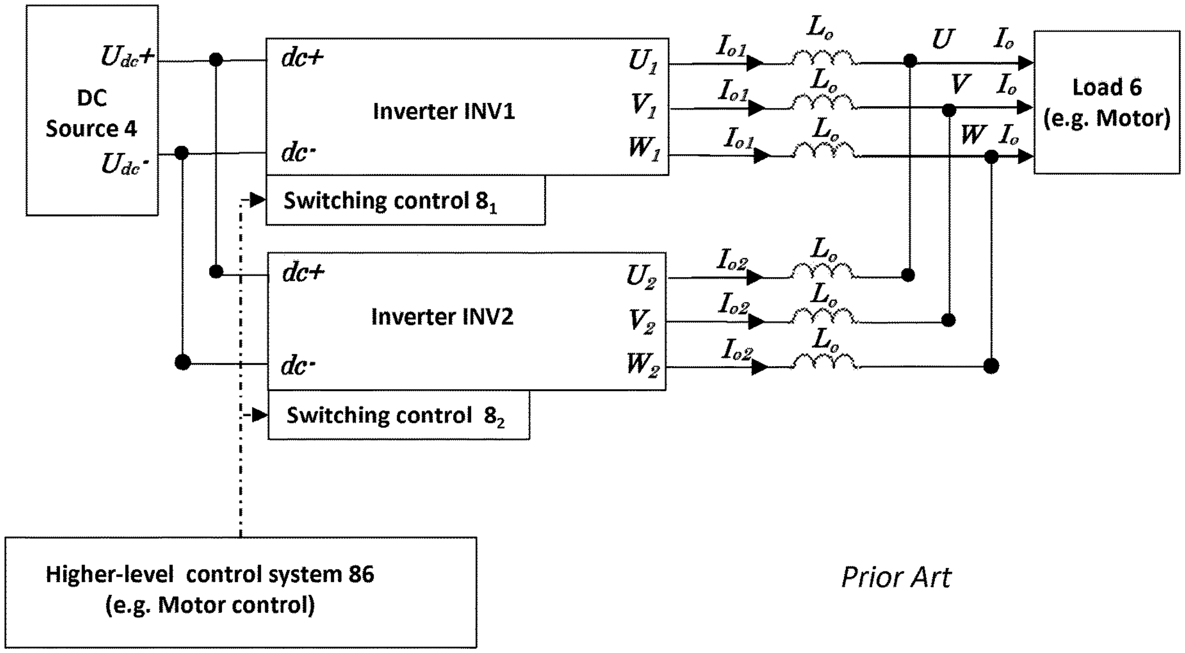
FIG. 1 is a block diagram that schematically illustrates an exemplary inverter system having a plurality of parallel-connected inverters.

FIG. 1 shows a block diagram that schematically illustrates an exemplary inverter system having a plurality of (i.e., two or more) inverters INV1, INV2, . . . , INVN connected in parallel from their DC side (e.g., DC link) terminals (e.g., dc+, dc−) and their AC side terminals (e.g., $U_1$, $V_1$, $W_1$, $U_2$, $V_2$, $W_2$). In the illustrated example, the inverters INV1 and INV2 are three-phase inverters providing three phase outputs $U_1$, $V_1$, $W_1$ and $U_2$, $V_2$, $W_2$, but it should be appreciated that parallel-connected inverters may be implemented as single-phase inverters, or generally include any number of inverter phases or phase legs. The parallel-connected inverters are fed by a common DC voltage source 4 with voltage $U_{dc}$, and inverters are feeding a common AC load 6. A typical application area of the parallel-connected inverters fed by a common DC voltage source 4 is an electric motor drive having an AC electric motor as a common load 6. There is a non-zero impedance at each phase output of each inverter, represented by inductances Lo in FIG. 1. The output inductances Lo may be intentionally implemented (e.g., a coil, a choke, etc.) or it may be just some leakage impedance of practical components and materials, such as cabling. The output inductances Lo may be substantially equal, but it must not necessarily be so. The corresponding phase outputs $U_1$, $U_2$, $V_1$, $V_2$, and $W_1$, $W_2$ of the parallel-connected inverters INV1 and INV2 are connected through the output inductances Lo to the common phase outputs U, V, and W, respectively. The corresponding phase outputs $U_1$, $U_2$, $V_1$, $V_2$, and $W_1$, $W_2$ of the parallel-connected inverters INV1 and INV2 may be connected together right after the output inductances Lo, and a single cable or multiple cables per phase U, V, and W may be used to connect the phase outputs to the load 6. Alternatively, each parallel-connected inverters INV1 and INV2 can be connected by means of its own cabling to the load 6, and the phase outputs $U_1$, $U_2$, $V_1$, $V_2$, and $W_1$, $W_2$ can be connected in parallel first at the terminals of the load 6. Output phase current Io of each phase U, V, W supplied to the load 6 is formed by combining phase output currents $I_{o1}$ and $I_{o2}$ of the respective phase outputs $U_1$, $U_2$, $V_1$, $V_2$, and $W_1$, $W_2$ of the parallel-connected inverters INV1 and INV2. The common DC supplied parallel-connected inverter modules INV1 and INV2 can be controlled to act like one high power inverter. This can be achieved by controlling the parallel inverter units with essentially same control commands.

Each inverter module INV1 and INV2 may have one or more bridge circuits (a full bridge or a half bridge), one bridge circuit for each inverter phase or phase leg. The bridge circuits of the same phase of different inverter modules are connected in parallel with one another. Each bridge circuit can include a plurality of controllable electronic switching elements or devices (e.g. insulated gate bipolar transistors (IGBTs) that operate in a switch mode, meaning that that they are controlled to transition from a blocking state (OFF state) to a conducting state (ON state), and vice-versa, by providing control pulses (often called switching control signals or gating signals) at a high switching frequency. In a PWM modulation scheme, the width of control pulses provided to the control inputs of the switching devices is varied to provide a desired output of the inverter. The parallel-connected inverter modules INV1 and INV2 may have a common switching control that provides switching signals or gating signals to operate switching devices of all inverter modules, or more preferably, each parallel-connected inverter module INV1 and INV2 may have a dedicated switching control unit $\mathbf{8}_1$ and $\mathbf{8}_2$ that provides switching signals or gating signals to operate switching devices of the respective inverter module, as illustrated in FIG. 1. Alternatively, the control may be distributed among a common switching control unit and inverter module-specific switching control units. In the latter cases, the inverter modules may be normal inverter modules (i.e., that can be used as single units) that can be connected in parallel as such. In embodiments, the switching control(s) $\mathbf{8}_1$ and $\mathbf{8}_2$ of the parallel-connected inverter modules INV1 and INV2 may be controlled by a higher-level control system 86 with simultaneous and essentially similar control signals or commands.

In embodiments, the higher-level control system 86 may be an electric motor control or similar. It can also include a common PWM generation function (for example, a PWM modulator) for all system elements and phases.

Figure 2:
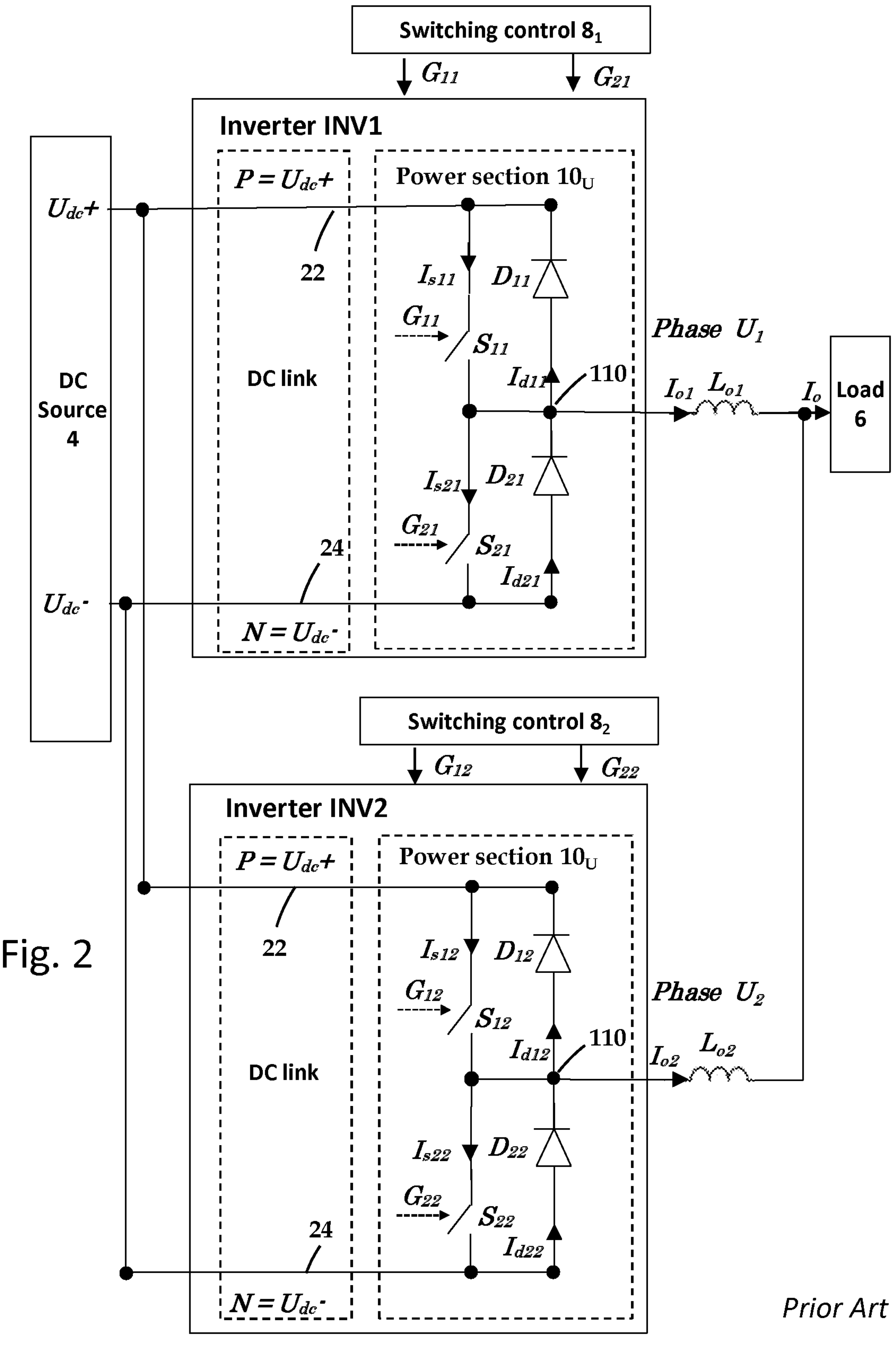
Fig. 2 Prior Art
FIG. 2 is a schematic of an exemplary inverter system having two parallel-connected hard-switching inverters.

The schematic of an exemplary inverter system (e.g., single-phase inverter system) having two so-called hard-switching inverters INV1 and INV2 connected in parallel is illustrated in FIG. 2 and described herein in order to alleviate comprehending operation and configuration of embodiments of the invention in relation to exemplary basic parallel-connected inverters. It is not intended to limit embodiments of the invention to the described and illustrated exemplary inverters. It shall be appreciated that the current sharing control according to embodiments of the invention is universally applicable to any number of parallel inverters, any type of inverters and their derivates and modifications regardless the specific design, configuration, and operation variations of an inverter from the exemplary inverter.

The parallel-connected inverters INV1 and INV2 may preferably be identical inverters having the same configuration and operation. The inverters INV1 and INV2 comprise power switching sections 10, such as half-bridge circuits, and dc-link rails 22 (positive dc-link potentials P) are connected to a first voltage terminal $U_{dc+}$ of the common DC power source 4, and dc-link rails 24 (negative dc-link potentials N) are connected to a second voltage terminal $U_{dc-}$ of the common DC power source 4. The DC link may be implemented in a similar manner as a DC link 2 discussed below with reference to FIG. 3. The output node 110 of each power switching section 10 can be connected through the corresponding output inductance $L_{o1}$ and $L_{o2}$ to the corresponding phase terminal of an ac load 6, such as an ac motor or ac grid or any applicable electric load, and thereby the corresponding phase outputs 110 of the inverters INV1 and INV2 (e.g., phase legs $U_1$ and $U_2$) are connected in parallel via $L_{o1}$ and $L_{o2}$. It should be appreciated that although a half-bridge inverter is illustrated as an example herein, the inverter may have other configurations, particularly a full-bridge configuration.

The exemplary half-bridge power section $\mathbf{10}_U$ of the inverter INV1 illustrated in FIG. 2 includes a pair of main or power switching devices $S_{11}$ and $S_{21}$ coupled in parallel to the dc-link rails 22 and 24. The first (upper) main switching device $S_{11}$ may have a first terminal electrically coupled to the positive dc-link rail 22 and a second terminal electrically coupled to an output node 110. The second (lower) main switching device $S_{21}$ having a first terminal coupled to output node 110 and a second terminal coupled to the negative dc-link rail 24. Across the upper main switching device $S_{11}$ between the positive dc-link rail 22 and the output node 110 is connected a first antiparallel diode $D_{11}$, and across the lower main switching device $S_{21}$ between the output node 110 and the negative dc-link rail 24 is connected a second antiparallel diode $D_{21}$. The upper main switching device $S_{21}$ is operable to turn on and turn off, and thereby to respectively connect and disconnect the dc-link rail 22 and the output node 110, in response to control signal(s) $G_{11}$ received from a control and driver circuitry, such as an inverter-specific switching controller $\mathbf{8}_1$ illustrated in FIG. 2. The lower main switching device $S_{21}$ is operable to turn on and turn off, and thereby to respectively connect and disconnect the dc-link rail 24 and the output node 110, in response to control signal(s) $G_{21}$ received from the control and driver circuitry, such as the switching controller $\mathbf{8}_1$. Similarly, the exemplary half-bridge power section $\mathbf{10}_U$ of the inverter INV2 illustrated in FIG. 2 includes a pair of main or power switching devices $S_{12}$ and $S_{22}$, a first antiparallel diode $D_{12}$, a second antiparallel diode $D_{22}$, and switching control signals $G_{12}$ and $G_{22}$ from a control and driver circuitry, such as an inverter-specific switching controller $\mathbf{8}_2$. In embodiments, the switching devices $S_{11}$, $S_{12}$, $S_{21}$ and $S_{22}$ may be insulated gate bipolar transistors (IGBT), or other type of semiconductor switching devices, such as integrated gate-commutated thyristors (IGCT), metal-oxide-semiconductor field-effect transistors (MOSFET), or silicon carbide (SiC) MOSFETs to name several examples.

Electronic switching devices, e.g., IGBTs, have a finite switching time, i.e. they cannot instantly switch from the conductive to the blocking state and vice versa. During this transition interval (commutation), the switch neither completely blocks nor fully conducts, and therefore, neither the voltage across the switch nor the current through the switch is zero. In other words, there is a considerable overlap between voltage and current waveforms. This simultaneous presence of voltage across the switch and current through it means that, during this overlapping period, power is being dissipated within the device. This power loss, called "a switching loss", reduces efficiency of the inverter, and when dissipated in the switch causes a major thermal stress on the switching device. The ability of a switching device to remove heat is limited. As the heat load increases, temperature rises which, in turn, degrades performance.

Conventional PWM inverters, such as the exemplary inverters in FIG. 2, are operated under such "hard switching" conditions, where the voltages across the switches and currents through the switches are changed abruptly from high values to zero and vice versa at a high switching frequency fs, with an overlap between the voltage and current waveforms, causing switching losses and generating a substantial amount of electro-magnetic interference. The switching losses are proportional to the switching frequency fs and thereby limit the maximum switching frequency. A high level of EMI is caused due to a wide spectrum of harmonics contained in rectangular PWM waveforms.

Soft-switching techniques aim to eliminate the switching losses by forcing a zero-voltage or a zero-current condition on the switch during a switching event. Switching at zero-voltage crossing is called zero-voltage switching (ZVS) whereas switching at zero-current crossing is called zero-current switching (ZCS). The auxiliary resonant commutated pole (ARCP) inverter is one of the most promising approaches for soft-switching inverters and has distinct potential benefits in a motor drive application. The ARCP inverter can be implemented using various topologies, which all perform essentially similarly. The output voltage wave form during commutation can be shaped to be motor friendly via suitable resonant circuit parameter selections. The stress in motor insulation and bearings is thus reduced. The basic configuration and operation of ARCP is described, for example, an article "The auxiliary resonant commutated pole converter", IEEE-IAS Conference Proceedings 1990, pp. 1228-35, and in U.S. Pat. No. 5,047,913 by R. W. De Doncker et al.

According to an aspect of the invention, the inverter system is an auxiliary resonant commutated pole (ARCP) inverter system, comprising a plurality of (i.e., two or more) ARCP inverters INV1, INV2, . . . , INVN connected in parallel from their DC side (e.g. DC link) input terminals and their AC side output terminals (e.g., $U_1$, $V_1$, $W_1$, $U_2$, $V_2$, $W_2$). In embodiments, an ARCP inverter comprises series-connected dc-link capacitances of equal size between the negative (N) and the positive (P) dc-link rails of the dc-link side of the inverter. At a midpoint, called a neutral point (NP), of capacitances there is provided a neutral point potential $U_{NP}$ that essentially corresponds to half of the voltage $U_{dc}$ between the dc rails. Each phase of the inverter is associated with at least one resonant capacitor to force zero-voltage turn-off switching conditions. Further, an auxiliary branch comprising a resonant inductor and auxiliary switching device(s) is connected between the neutral point and a phase output to operate under zero current switching conditions. In the ARCP, the commutation is accomplished through the auxiliary circuitry in a finite amount of time. The auxiliary circuit is only used when the output is required to commutate from one voltage rail to the other. In order to ensure that the inverter output voltage at least reaches the positive and negative dc rail voltages during each resonant commutation cycle, a boost current is added to the resonant current by appropriately controlling the conduction times of the auxiliary switching devices. A predetermined boost current level in the inductor adds sufficient energy to the resonant operation to ensure that the output voltage attempts to overshoot the respective converter antiparallel diode and clamping the output voltage to the respective rail voltage. Ideally, the main switches turn on and off in a zero-voltage condition, and the auxiliary switch(es) in zero-current condition, which reduce the occurring switching losses. Consequently, the switching frequency can be increased without a considerable loss penalty. Low acoustic noise of such a drive is appreciated in many applications. High switching frequency also enables higher fundamental output frequencies with low distortion, making the ARCP topology attractive for high-speed drive applications.

Figure 3:
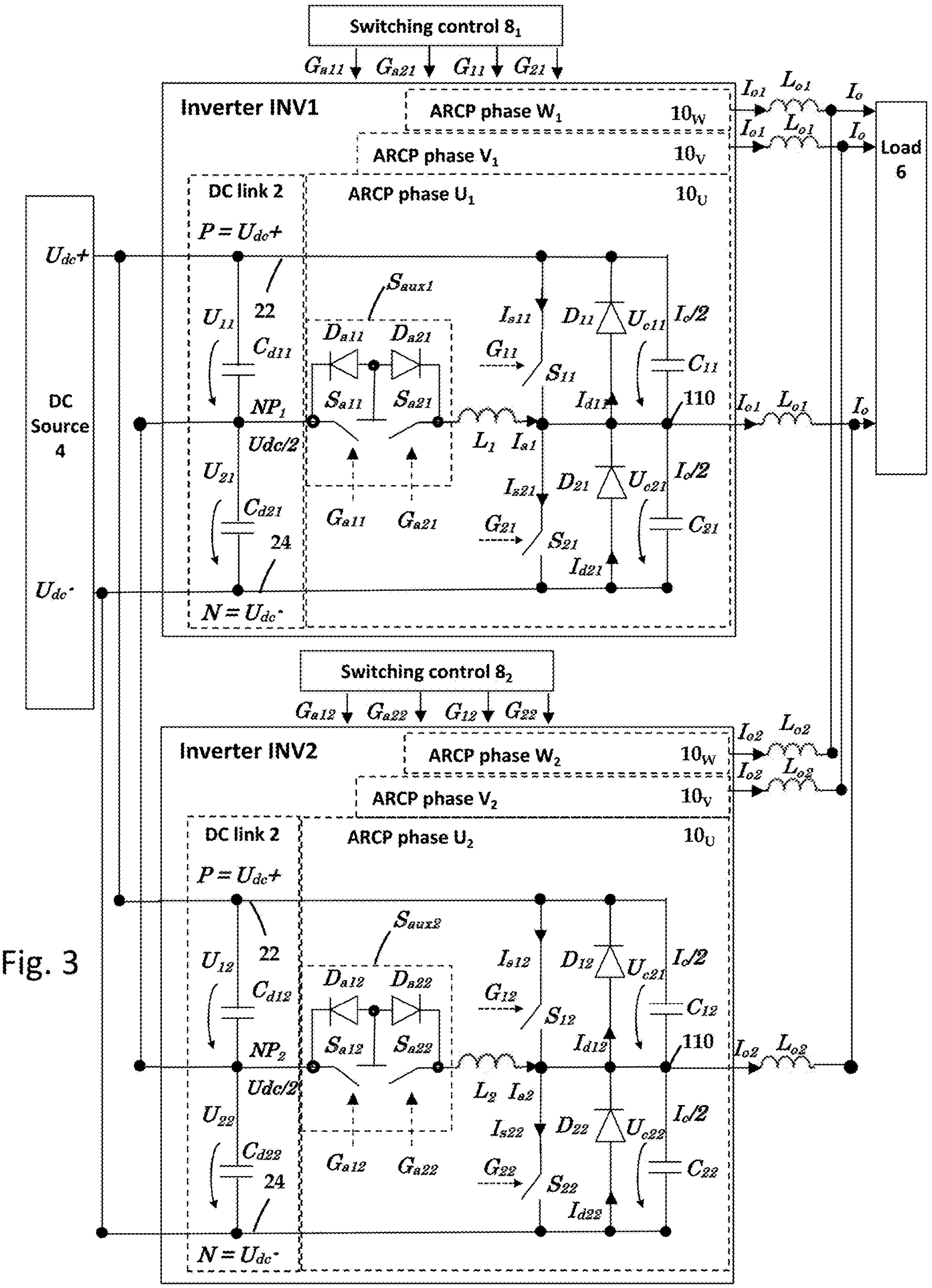
FIG. 3 is a schematic block diagram of an exemplary ARCP inverter system having a plurality of parallel-connected inverters.

The schematic of an exemplary ARCP inverter system having a plurality of (i.e., two or more) inverters INV1, INV2, . . . , INVN connected in parallel is illustrated in FIG. 3 and described herein in order to alleviate comprehending operation and configuration of embodiments of the invention in relation to an exemplary basic ARCP. It is not intended to limit embodiments of the invention to the described and illustrated exemplary ARCP(s) with only two parallel inverters. It shall be appreciated that the current sharing control according to embodiments of the invention is universally applicable to any type of ARCP inverters and their derivates and modifications regardless the specific design, configuration, and operation variations of an inverter from a basic ARCP inverter.

The parallel-connected ARCP inverters INV1 and INV2 may preferably be identical modules having the same configuration and operation. The exemplary ARCP inverter INV1 illustrated in FIG. 3 includes a DC-link 2 comprising a first dc-link rail 22, and a second dc-link rail 24, a first dc-link capacitor $C_{d11}$ coupled with the first dc-link rail 22 and a dc-link midpoint, called a neutral point NP1, and a second dc-link capacitor $C_{d12}$ coupled with the second dc-link rail 24 and the neutral point NP1. During operation, the first dc-link rail 22 is at a first voltage, so called positive (P) dc-link potential, and the second dc-link rail 24 is at a second voltage lower than the first DC voltage, so called negative (N) dc-link potential, and the dc-link midpoint NP1 is at a midpoint voltage, so called neutral point voltage $U_{NP}$. The capacitances of the dc-link capacitors $C_{d11}$ and $C_{d21}$ are substantially equal, for example $C_{d11}=C_{d21}=2C_{dc}$, so that the voltages $U_{11}$ and $U_{21}$ provided across the dc-link capacitors $C_{d1}$ and $C_{d2}$ series-connected between the dc-link rails 22 and 24 are substantially equal, i.e. a half of a dc-link voltage $U_{dc}=U_{11}+U_{21}$ between the dc-link rails 22 and 24. Thus, also the neutral point voltage or potential $U_{NP}$ essentially corresponds to half of the voltage $U_{dc}$, in other words $U_{NP}=U_{dc}/2$. The exemplary ARCP inverter INV2 includes a similar DC link 2 having dc-link rails 22 and 24, dc-link capacitors $C_{d21}$ and $C_{d22}$, voltages $U_{21}$ and $U_{22}$, and dc-link midpoint $NP_2$.

The dc-link rails 22 of the parallel-connected ARCP inverters (positive dc-link potentials P) are connected to each other and to a first voltage terminal $U_{dc+}$ of the common DC power source 4. The dc-link rails 24 of ARCP inverter modules (negative dc-link potentials N) are connected to each other and to a second voltage terminal $U_{dc-}$ of the common DC power source 4. Further, the neutral points NP1 and NP2 of the parallel-connected ARCP inverter modules may be connected to each other as shown in FIG. 3. The connection of the neutral points NP1 and NP2 is not essential to this invention, and they may as well be not connected to each other.

The common dc power input to the parallel-connected ARCP or hard-switching inverter modules INV1 and INV2 may be obtained from any kind of a dc power source 4, such as from an existing power supply network through a rectifier, or from a battery, fuel cell, photovoltaic array, etc. It shall be appreciated that dc-link 2 may be provided in a number of forms and may have a number of voltages and other attributes. It shall also be appreciated that the voltage difference between positive and negative dc-link rails is flexible, depending on how the dc-link 2 is charged or how the dc-link 2 is discharged by the connected circuits. For example, some embodiments may use a front-end isolation transformer and rectifier connected to the dc-link with the positive and negative rails floating and the differential voltage typically in the range of 50V-1500V, but in principle in other voltages outside this range as well. In other embodiments, the positive rail, mid-point, or negative rail may be grounded to earth. Preferably, the positive and negative rails are balanced. For example, if the dc-link neutral point NP is at 0 VDC, dc-link rail 22 would be at a positive voltage (e.g., in the range of +25 VDC to +500 VDC, the range of in the range of +150 VDC to +400 VDC or other positive voltage ranges) and dc-link rail 24 would be at a negative voltage corresponding to the positive voltage (e.g., in the range of −25 VDC to −500 VDC, the range of in the range of −150 VDC to −400 VDC or other negative voltage ranges corresponding to the other positive voltage ranges). It shall be appreciated that the foregoing examples are few of many voltage values and polarities that may be present in or associated with the operation of dc-link 2. It shall be additionally appreciated that the voltage values of the foregoing examples may be subject to fluctuation, margins of error, tolerance, and other variations and may not be rigidly fixed to the precise example values stated. It shall be further appreciated the term bus may be utilized in place of the term link such that, for example, references to a dc-link are understood to encompass a dc-bus and vice versa.

The exemplary ARCP inverters INV1 and INV2 illustrated in FIG. 3 may be three-phase bridge ARCP inverters including a power section $\mathbf{10}_U$, $\mathbf{10}_V$, and $\mathbf{10}_W$ for each phase or phase leg $U_1$, $U_2$, $V_1$, $V_2$, $W_1$ and $W_2$, respectively. Operation and configuration of the inverters INV1 and INV2 are illustrated and described in more detail primarily with respect to one phase or phase leg $U_1$ and $U_2$ herein, but the other phases or phase legs $V_1$, $V_2$, $W_1$ and $W_2$ of the inverters INV1 and INV2 can have identical operation and configuration. In the ARCP inverter INV1, the power sections $\mathbf{10}_U$, $\mathbf{10}_V$, and $\mathbf{10}_W$ of phase legs $U_1$, $V_1$ and $W_1$ may be connected to the positive dc-link rail 22, the neutral point $NP_1$, and the negative dc-link rail 24 of the common dc-link 2, and thereby to the negative (N), the neutral point (NP) and the positive (P) dc-link potentials, as illustrated in FIG. 2. The output node 110 of each power section $\mathbf{10}_U$, $\mathbf{10}_V$, and $\mathbf{10}_W$ is connected to the corresponding phase of an ac load 6, such as an ac motor or ac grid or any applicable electric load, via a non-zero impedance (presented generally by an output inductance $L_{o1}$ herein), which can consist of the impedance of connecting cable or busbar and it can also have additional elements if needed. In the ARCP inverter INV2, the power sections $\mathbf{10}_U$, $\mathbf{10}_V$, and $\mathbf{10}_W$ of phase legs $U_2$, $V_2$ and $W_2$ may be connected to the common dc-link 2 of the inverter INV2 in a similar manner as in the inverter INV1. The phase output node 110 of each power section $\mathbf{10}_U$, $\mathbf{10}_V$, and $\mathbf{10}_W$ of the inverter INV2 is connected to the corresponding phase of the ac load 6 via a non-zero impedance (presented generally by an output inductance $L_{o2}$ herein), and thereby each phase output of the inverter INV2 is connected in parallel with the corresponding phase output of the inverter INV1. It should be appreciated that although a three-phase ARCP inverter is illustrated as an example herein, an ARCP inverter may be implemented as a single-phase inverter, or generally include any number of inverter phases or phase legs. Moreover, although a half-bridge ARCP inverter is illustrated as an example herein, the ARCP inverter may have other configurations, particularly a full-bridge configuration.

The exemplary half-bridge power section $\mathbf{10}_U$ of the ARCP inverter INV1 illustrated in FIG. 3 includes a pair of main or power switching devices $S_{11}$ and $S_{21}$ coupled in parallel to the dc-link rails 22 and 24 of the dc-link 2. The first main switching device $S_{11}$ may have a first terminal electrically coupled to the positive dc-link rail 22 and a second terminal electrically coupled to an output node 110. The second main switching device $S_{21}$ having a first terminal coupled to output node 110 and a second terminal coupled to the negative dc-link rail 24. Across the first main switching device $S_{11}$ between the positive dc-link rail 22 and the output node 110 is connected a first antiparallel diode $D_{11}$, and across the second main switching device $S_{21}$ between the output node 110 and the negative dc-link rail 24 is connected a second antiparallel diode $D_{21}$. Further, a first resonant capacitor $C_{11}$ is operationally connected (i.e., directly or via additional components, such as an active or passive damping circuit series connected with the resonant capacitor) in parallel with the first main switching device $S_{11}$, and a second resonant capacitor $C_{21}$ is operationally connected in parallel with the second main switching device $S_{21}$. More generally, there may be one or more resonant capacitors connected in such manner that at least one terminal of the resonant capacitor(s) is connected to one of the dc-link rails (P, NP, N) and the other terminal(s) is (are) operationally connected to the phase output node 110. The first main switching device $S_{11}$ is operable to turn on and turn off, and thereby to respectively connect and disconnect the dc-link rail 22 and the output node 110, in response to control signal(s) $G_{11}$ received from a control and driver circuitry, such as an inverter-specific ARCP switching controller $\mathbf{8}_1$ illustrated in FIG. 3. The second main switching device $S_{21}$ is operable to turn on and turn off, and thereby to respectively connect and disconnect the dc-link rail 24 and the output node 110, in response to control signal(s) $G_{21}$ received from the control and driver circuitry, such as the ARCP switching controller $\mathbf{8}_1$. All power sections $\mathbf{10}_U$, $\mathbf{10}_V$, and $\mathbf{10}_W$ of phase legs $U_1$, $V_1$ and $W_1$ in the ARCP inverter INV1 may be controlled by the same inverter-specific switching controller $\mathbf{8}_1$. Similarly, the exemplary half-bridge power section $\mathbf{10}_U$ of the ARCP inverter INV2 illustrated in FIG. 3 includes a pair of main or power switching devices $S_{12}$ and $S_{22}$, a first antiparallel diode $D_{12}$, and a first resonant capacitor $C_{12}$, a second antiparallel diode $D_{22}$, a second resonant capacitor $C_{22}$, and switching control signals $G_{12}$ and $G_{22}$ from a control and driver circuitry, such as an inverter specific ARCP switching controller $\mathbf{8}_2$. All power sections $\mathbf{10}_U$, $\mathbf{10}_V$, and $\mathbf{10}_W$ of phase legs $U_2$, $V_2$ and $W_2$ in the ARCP inverter INV2 may be controlled by the same inverter-specific switching controller $\mathbf{8}_2$. In embodiments, the switching devices $S_{11}$, $S_{12}$, $S_{21}$ and $S_{22}$ may be an insulated-gate bipolar transistor (IGBT), or another type of semiconductor switching device, such as an integrated gate-commutated thyristor (IGCT), a metal-oxide-semiconductor field-effect transistor (MOSFET), or a silicon carbide (SiC) MOSFET to name several examples.

In operation, when the first main switch $S_{11}/S_{12}$ is turned on (to a conductive state), a first switch current $I_{s11}/I_{s12}$ can flow between the dc-link rail 22 and the output node 110. Similarly, when the second main switching device $S_{21}/S_{22}$ is turned on (to a conductive state), a second switch current $I_{s21}/I_{s22}$ can flow between the output node 110 and the dc-link rail 24. On the other hand, when the first main switching device $S_{11}/S_{12}$ is turned off (to a non-conductive state), the first switch current $I_{s11}$ will not flow in the switch-forward direction between the dc-link rail 22 and the output node 110, although a current $I_{d11}/I_{d12}$ may flow in the switch-reverse direction through the first anti-parallel diode $D_{11}/D_{12}$ of the first main switching device $S_{11}/S_{12}$. Similarly, when the second main switching device $S_{21}/S_{22}$ is turned off (to a non-conductive state), the second switch current $I_{s21}/I_{s22}$ will not flow in the switch-forward direction between the output node 110 and the dc-link rail 24, although a current $I_{d21}/I_{d22}$ may flow in the switch-reverse direction through the anti-parallel diode $D_{21}/D_{22}$ of the second switching device $S_{21}/S_{22}$. Thus, by turning on and off the first main switching device $S_{11}/S_{12}$ and the second main switching device $S_{21}/S_{22}$, the output voltage at the output node 110 will be controlled or commutated to be either the voltage P from the dc-link rail 22 or the voltage N from the dc-link rail 24. The purpose of the resonant capacitors $C_{11}/C_{12}$ and $C_{21}/C_{22}$ is to limit the voltage slew rate of the output node; this ensures that the voltages $U_{c11}/U_{c12}$ and $U_{c21}/U_{c22}$ across the main switching devices $S_{11}/S_{12}$ and $S_{21}/S_{22}$ do not significantly change during turn-off such that the main switching devices are turned off at essentially zero-voltage.

The exemplary half-bridge power section $\mathbf{10}_U$ of the ARCP inverter INV1 illustrated in FIG. 3 further includes an auxiliary circuit comprising a resonant inductor $L_1$ and a bidirectional auxiliary switch $S_{aux1}$ connected in series between the neutral point $NP_1$ and the output node 110. The auxiliary switch $S_{aux1}$ is operable to turn on and turn off, and thereby to respectively connect and disconnect the neutral point and the output node 110, in response to control signals received from the control and driver circuitry, such as the ARCP switching controller $\mathbf{8}_1$. The auxiliary switch $S_{aux1}$ can behave like a bidirectional thyristor: it can be triggered into conduction, and it turns off if or before the current tries to reverse its direction. In embodiments, the bidirectional auxiliary switch $S_{aux1}$ may be implemented with a pair of ordinary switching devices connected back-to-back, for example in a common-emitter or common-collector configuration and provided with anti-parallel diodes. FIG. 3 illustrates an exemplary auxiliary switch $S_{aux1}$ comprising a first auxiliary switching device $S_{a11}$ and a second auxiliary switching device $S_{a21}$ in a common-emitter series connection, a first anti-parallel diode $D_{a11}$ connected across the first auxiliary switching device $S_{a11}$, and a second antiparallel diode $D_{a21}$ connected across the second auxiliary switching device $S_{a21}$. One of the two auxiliary switching devices $S_{a11}$ and $S_{a21}$ is turned on and conducting at a time, as is one of the two antiparallel diodes $D_{a11}$ and $D_{a21}$, in response to control signals $G_{a11}$ and $G_{a21}$ received from a control and driver circuitry, such as an ARCP switching controller $\mathbf{8}_1$ illustrated in FIG. 3. In each case, the auxiliary current $I_{a1}$ will flow through one diode in series with one switch. The auxiliary switching devices in the auxiliary circuit are turned on and off at zero-current. When the first auxiliary switching device $Sa_{11}$ is turned on and the second switching device $S_{a21}$ is turned off, the auxiliary current $I_{a1}$ will flow in one direction through $S_{a11}$ and $D_{a21}$. When the first auxiliary switching device $S_{a11}$ is turned off and the second switching device $S_{a21}$ is turned on, the auxiliary current $I_{a1}$ will flow in the opposite direction through $S_{a21}$ and $D_{a11}$. The auxiliary circuit is only used when the output node 110 is required to commutate from one voltage rail to the other. The auxiliary circuit functions by creating a pulse of current that, in combination with the resonant capacitors, is used to slew the output voltage on the output node 110. Similarly, the exemplary half-bridge power section $\mathbf{10}_U$ of the ARCP inverter INV2 illustrated in FIG. 3 further includes an auxiliary circuit comprising a resonant inductor $L_2$ and a bidirectional auxiliary switch $S_{aux2}$ connected in series between the neutral point $NP_2$ and the output node 110. In embodiments, the auxiliary switch $S_{aux2}$ may be implemented with a pair of ordinary switches and antiparallel diodes in a similar manner as the auxiliary switch $S_{aux1}$. FIG. 3 illustrates an exemplary auxiliary switch $S_{aux2}$ comprising a first auxiliary switching device $S_{a12}$ and a second auxiliary switching device $S_{a22}$ in a series connection, a first antiparallel diode $D_{a12}$ connected across the first auxiliary switching device $S_{a12}$, and a second antiparallel diode $D_{a22}$ connected across the second auxiliary switching device $S_{a22}$. One of the two auxiliary switching devices $S_{a12}$ and $S_{a22}$ is turned on and conducting at a time, as is one of the two antiparallel diodes $D_{a12}$ and $D_{a22}$, in response to control signals $G_{a21}$ and $G_{a22}$ received from a control and driver circuitry, such as an ARCP switching controller 82 illustrated in FIG. 3.

The switching control $\mathbf{8}_1 \ldots \mathbf{8}_n$ illustrated in FIGS. 1, 2 and 3 refers generally to any control functions, logic, hardware, firmware, software, etc. required to control switching devices in the hard-switching or ARCP phase leg(s) based on a PWM signal or PWM signals. Given a PWM signal, a standard hard-switching inverter does not need too much additional logic to form a complete inverter drive system. At a minimum, the direct PWM signal is sent to one switch while the complement of the PWM input signal is sent to the other switch in that phase. The ARCP on the other hand, requires more than the PWM modulation and control: it requires an additional more complex control, particularly due to the auxiliary circuit and the auxiliary switch(es).

Figure 4:
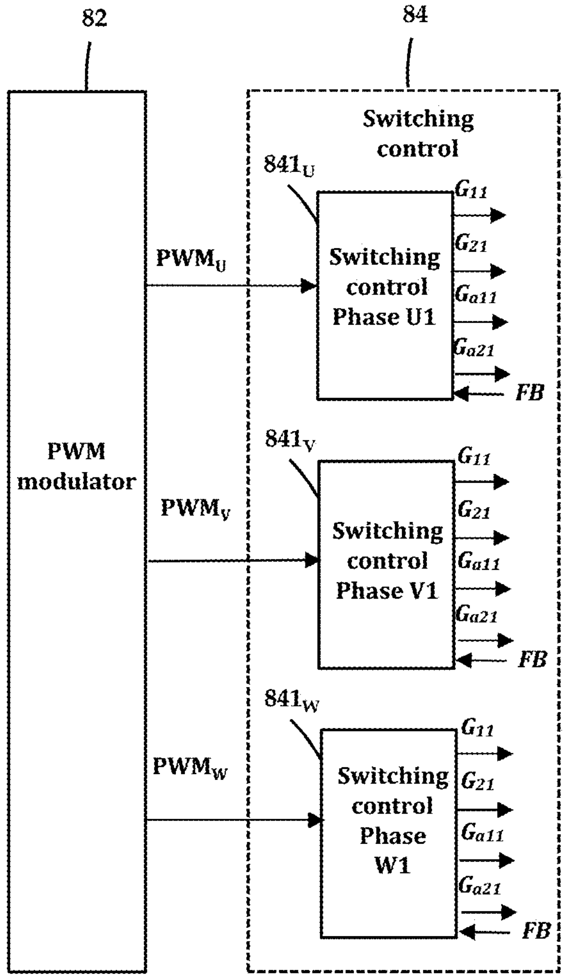
FIG. 4 is a schematic block diagram of an ARCP switching controller having a PWM modulator and ARCP control functions.

FIG. 4 is a schematic block diagram of an exemplary embodiment of an ARCP switching controller $\mathbf{8}_1$ having a PWM modulator 82 and ARCP control functions 84 separated. In the illustrated example, the ARCP control 84 may include a dedicated ARCP control module $\mathbf{841}_U$, $\mathbf{841}_V$, and $\mathbf{841}_W$ adapted to provide control signals, such as $G_{11}$, $G_{21}$, $G_{a11}$ and $G_{a21}$ to each ARCP phase leg $U_1$, $V_1$ and $W_1$, respectively, based on a respective PWM signal $PWM_U$, $PWM_V$ and $PWM_W$ received from the PWM modulator 82. The ARCP control 84, or the respective ARCP control module $\mathbf{841}_U$, $\mathbf{841}_V$, and $\mathbf{841}_W$, may have to provide for instance the following functions for each phase leg $U_1$, $V_1$ and $W_1$: Activation of the correct auxiliary switch before commutating the main switches, controlling the boost time, ensuring that the main switches are switched at essentially zero-voltage, ensuring that the auxiliary switches are switched at zero-current, initially starting the switching sequence upon power up, etc. Depending on a selected ARCP control strategy, various sensing feedbacks (FB) may be required to implement the control algorithms, such as feedback from main switch zero-voltage sensors, auxiliary switch zero-current sensors, an auxiliary current sensor, an output (load) current sensor, a dc-link voltage sensor, a dc-link capacitor sensor(s), a neutral point voltage sensor, etc.

As used herein, the mode of commutating the output current $I_o$ from a diode to a switch (e.g., the current $I_{o1}$ from the diode $D_{21}$ to the switch $S_{11}$) in ARCP is called mode A and the mode of commutating the output current $I_o$ from a switch to a diode (e.g., the current $I_{o1}$ from the switch $S_{11}$ to the diode $D_{21}$) is called mode B, when the auxiliary circuit is involved in commutation and a boost current is provided. The mode of commutating high output current $I_o$ from a switch to diode, when the output current Io itself is sufficient to drive the output voltage from one dc-link rail to another and the auxiliary circuit is not involved, is called mode O herein. The terms mode A and mode B are used herein also for hard-switching commutations from a diode to switch and switch to diode, respectively, e.g. in inverters illustrated in FIG. 2.

Mode A commutation: If the output current $I_o$ is positive (Io>0) and the output voltage $U_o$ swings from the potential N (the dc-link 24) to the potential P (the dc-link 22), the lower diodes $D_{21}$ and $D_{22}$ commutate their currents ($I_{d21}$ and $I_{d22}$, respectively) to upper switches $S_{11}$ and $S_{12}$, respectively. If the output current $I_o$ is negative (Io<0) and the output voltage $U_o$ swings from the potential P (the dc-link 22) to the potential N (the dc-link 24), the upper diodes $D_{11}$ and $D_{12}$ commutate their currents ($I_{d11}$ and $I_{d12}$, respectively) to lower switches $S_{21}$ and $S_{22}$, respectively.

Mode B commutation: If the output current $I_o$ is positive (Io>0) and the output voltage $U_o$ swings from the potential P (the dc-link 22) to the potential N (the dc-link 24), the upper switches $S_{11}$ and $S_{12}$ commutate their currents to lower diodes $D_{21}$ and $D_{22}$, respectively. If the output current $I_o$ is negative (Io<0) and the output voltage $U_o$ swings from the potential N (the dc-link 24) to the potential P (the dc-link 22), the lower switches $S_{21}$ and $S_{22}$ commutate their currents to diodes $D_{11}$ and $D_{12}$, respectively.

In the following, examples of typical ARCP commutation in modes A and B are briefly described for a single phase, e.g., the ARCP phase $V_1$, of the ARCP inverter INV1. The commutation modes A and B of the corresponding the ARCP phase $V_2$ of the ARCP inverter INV2 are similar.

As an example of the mode A, a commutation of the positive output current $I_{o1}$ (Io>0) from the lower diode $D_{21}$ to the upper main switch $S_{11}$ and the output voltage $U_o$ from N to P will described with reference to FIGS. 5A-5F.

The diode $D_{21}$ is conducting the output current $I_{o1}$ ($=I_{d21}$), the diode $D_{21}$ supplying the output current $I_o$ (FIG. 5A) and switches $S_{11}$, $S_{a11}$ and $S_{a21}$ not conducting (turned off); during the commutation $S_{21}$ turns off and $S_{11}$ turns on.

The command for commutation arrives at time instant $t_{Ao}$. The auxiliary switch $S_{a11}$ is turned on (at zero current) after a time interval $t_{wA1}$, which marks the start of the boosting interval $t_{bA1}$. The neutral point voltage $U_{NP1}$ is applied across the resonant inductor $L_1$, which causes the auxiliary current $I_{a1}$ through the resonant inductor $L_1$ to ramp up linearly (FIG. 5C), and the current $I_{d21}$ in diode $D_{21}$ decreases accordingly as $I_{d21}=I_{o1}-I_{a1}$ (FIG. 5A). In order to turn the diode $D_{21}$ off, the auxiliary current $I_{a1}$ must increase to the level of the output current $I_{o1}$ and even beyond (by a boosting current $I_{bA1}$), so that finally $I_{a1}=I_{o1}+I_{bA1}$. The boosting current portion $I_{bA1}$ of the total inductor current $I_{a1}$ is diverted to the switch $S_{21}$ parallel to the diode $D_{21}$ (FIG. 5B) while the load 6 takes its own, i.e., the output current $I_{o1}$.

The switch $S_{21}$ is turned off after a time interval $t_{bA1}$ (FIG. 5B), which marks the end of the boosting interval $t_{ba1}$, and the commutation swing of the output voltage $U_{c21}$ from N (zero) to P (the full $U_{dc}$) starts. The boosting current $I_{bA1}$ must be large enough to force the output potential swing from N to P, charging the capacitor $C_{21}$ and discharging the capacitor $C_{11}$. If there is a slight unbalance of the dc link voltage halves so that $U_{21}<U_{11}$, more boosting current is needed, and if $U_{21}>U_{11}$, less boosting current suffices.

The interval for the swing of $U_{C21}$ from zero to $U_{dc}$ has duration $t_{sA1}$.

$$t_{sA1} = \sqrt{L_1 C}\left[\cos^{-1}\left(\frac{U_{c21} - U_{dc}}{\sqrt{L_1/C}\, I_{pA}}\right) - \beta\right] \tag{1}$$

where $I_{pA1}$ is the peak value of the resonant part of the inductor current $$I_{pA1} = \sqrt{\frac{CU_{c21}^2}{L_1} + I_{bA1}^2} \tag{2}$$

β is a phase angle $$\beta = \sin^{-1}(I_{bA}/I_{pA}) \tag{3}$$

and $C=C_{11}+C_{21}$ in the exemplary topology shown in FIG. 3. The voltage change rate average is $du/dt=U_{dc}/t_{sA1}$.

When $U_{c21}$ reaches $U_{dc}$ and $U_{c11}$ reaches zero after a time interval $t_{sA1}$ (FIG. 5D), the portion of the auxiliary current $I_{a1}$ exceeding the output current $I_{o1}$ turns on the diode $D_{11}$ and is called $I_{tA1}$ (FIGS. 5C and 5D). The switch $S_{11}$ may be turned on as soon as $U_{c21}$ has reached $U_{dc}$. The boosting time $t_{bA1}$ may preferably be set to a value that minimizes the current $I_{tA1}$ close to zero. This way the losses and the reverse recovery current of $D_{11}$ will be minimized, as well as the duration of the commutation. This strategy narrows the window $t_{tAx}$. Thus, the precise timing of $S_{11}$ turn-on is critical.

Because the diode $D_{11}$ and the switch $S_{11}$ clamp the output voltage to the positive dc potential P, the inductor current $I_{a1}$ decays linearly to zero during a time interval is $t_{tA}$ (FIG. 5C).

The current $I_{d11}$ decays first from $I_{tA1}$ to zero in time $t_{tAx}$, whereafter the switch current $I_{s11}$ increases linearly from zero to the load current level $I_{o1}$ (FIG. 5F) while $I_{a1}$ continues to decrease from $I_{o1}$ towards zero (FIG. 5C), after which the auxiliary diode $D_{a21}$ turns off and the commutation sequence is finished.

The total duration of the commutation from the turn-on of the auxiliary switch $S_{a21}$ to completion in mode A is $t_A=t_{bA1}+t_{sA1}+t_{tA1}$. There is a current in the auxiliary branch during this time interval.

As an example of the mode B, a commutation of the positive output current $I_{o1}$ (Io>0) from the upper main switch $S_{11}$ to the lower diode $D_{21}$ and a swing of the output voltage $U_o$ from N to P will described with reference to FIGS. 6A-6D.

The switch $S_{11}$ is conducting the output current $I_{o1}$ ($I_{o1}=I_{s11}$) (FIG. 6A) and switches $S_{21}$, $S_{a11}$ and $S_{a21}$ not conducting (turned off); during the commutation the upper switch $S_{11}$ turns off and the lower diode $D_{21}$ turns on.

The command for commutation arrives at time instant $t_{BO}$. After a waiting time $t_{wB1}$, the auxiliary switch $S_{a21}$ is turned on, and boosting current $I_{bB1}$ (in negative direction in the inductor $L_1$, positive direction in $S_{11}$) is linearly built up for a time $t_{bB1}$ (FIG. 6B).

The boosting current adds on top of the load current in the switch $S_{11}$, which turns off a total current of $I_{s11}=I_{o1}+I_{bB1}$ at the end of $t_{bB1}$ (FIG. 6A). The swing of $U_{c11}$ from zero to $U_{dc}$ starts (FIG. 6C). The output potential swing from P to N is a combination of the linear portion caused by $I_{o1}$ and a resonant portion caused by $I_{bB1}$. The duration of the swing is $t_{sB1}$ $$t_{sB1} = \sqrt{L_1 C}\left[\cos^{-1}\left(\frac{U_{c11} - U_{dc}}{\sqrt{L_1/C}\, I_{pB1}}\right) - \frac{\pi}{2} - \gamma\right] \tag{4}$$

where $I_{pB1}$ is the peak value of the resonant part of the inductor current, $$I_{pB1} = \sqrt{\frac{CU_{c11}^2}{L_1} + (I_{o1} - I_{bB1})^2} \tag{5}$$

γ is a phase angle, $$\gamma = \tan^{-1}\left(\frac{\sqrt{C/L_1}\, U_{c11}}{-I_{o1} + I_{bB1}}\right) \tag{6}$$

and $C=C_{11}+C_{21}$. The voltage change rate average is $du/dt=U_{dc}/t_{sB1}$.

The remaining current $I_{a1}$ in the inductance at the end of the swing adds initially on top of the output current $I_{o1}$ in the diode $D_{21}$ so that $I_{d21}=I_{o1}+I_{tB}$. The diode current decays linearly to the final value $I_o$, as the inductor current reaches zero again after time $t_{tB}$ (FIGS. 6B and 6D). The total duration of the commutation in mode B from the triggering of $S_a$ to completion is $t_B=t_{bB}+t_{sB}+t_{tB}$.

The descriptions above for modes A and B assumed a positive direction of $I_o$. The operation for a negative $I_o$ ($I_o<0$) is identical, just the roles of $S_{11}$ and $S_{21}$, $D_{11}$ and $D_{21}$, and $U_{c11}$ and $U_{c21}$ are swapped from mode A to mode B, and vice versa.

The commutation for a corresponding phase in the plurality of parallel-connected inverters can be initiated by similar commutation commands at the same time instant. For example, the ARCP commutation for the ARCP phase $V_1$ of the ARCP inverter INV1 and the ARCP phase $V_2$ of the ARCP inverter INV2 can be initiated by similar commutation commands at the time instant $t_{Ao}$ for mode A commutation and at the time instant tBo for mode B commutation. In an ideal case, the output currents $I_{o1}$ and $I_{o2}$ of the parallel-connected ARCP inverter would be equal. However, the ideal behavior during commutations would require that the corresponding switches, e.g., $S_{11}$ and $S_{12}$, in the parallel operated inverter turn on at the same instant when commutating the output potential $U_o$, for example from N to P. Likewise, they should turn off at the same instant when commutating the output potential from P to N. Unfortunately, the parallel operated inverters do not behave similarly, for example due to parameter differences of switch components and differing impedances in parallel branches, the output currents from the parallel inverters can be unequal in value. In other words, there can be uneven current sharing between the inverters. Due to thermal and economic reasons, it is of utmost importance that the parallel-connected inverters share the load current as evenly as possible.

According to an aspect of the invention, current sharing between the plurality of parallel-connected ARCP or hard-switching converter legs is balanced by a control arrangement, such as the switching controls functions 84 or switching control module 841U, 841V, and 841W. FIG. 7 shows a flow diagram illustrating an exemplary operation of the control arrangement. The control arrangement may sense the leg output current $I_o$ in each of the parallel-connected converter legs (step 72) and have an individual autonomous leg-specific switching instant adjustment for the main switches of each of the parallel-connected converter legs to shift the first mode A commutation of the respective converter leg later in time and to shift the second mode B commutation of the respective converter leg earlier in time by a variable timestep proportional to the value of the sensed leg current of the respective converter leg (step 74). In other words, if the value of the sensed leg output current in one converter leg is larger than in the other converter leg, then in mode A, the higher-current leg will commutate later than the leg with less current, and in mode B, the higher-current leg will commutate earlier than the leg with less current.

Ideally, when the current sharing is in balance, the output currents of the parallel-connected converter legs (e.g., phase legs $U_1$ and $U_2$ in FIG. 3) are equal and their difference or a differential output current $I_{do}$ is zero, (e.g., $I_{do}=I_{o1}-I_{o2}=0$). For example, if the sensed leg output currents of the parallel-connected converter legs had equal values, the autonomous switching instant adjustments of the parallel-connected legs would (independently from each other, each based on its own sensed leg output current only) result in commutating their output voltage swings to start approximately simultaneously. On the other hand, if the sensed leg output currents of the parallel-connected legs had different values, the autonomous switching instant adjustments of the legs would (independently from each other) result in commutating their output voltage swings to start differently, i.e. earlier or later, each depending on its own sensed leg output current value in manner (in a direction) that a differential output current (e.g., $I_{do}=I_{o1}-I_{o2}$) is reduced. In other words, these differences in the starting instant of the output voltage swings (e.g., $U_{c21}$ and $U_{c22}$, referred to the N potential in FIG. 3) would create an effective volt-second difference to the loop inductance ($\Delta L=L_{o1}+L_{o2}$) in a direction that tends to reduce the output current difference $I_{do}$. The shifting of the output voltage swing in time may also be called as pulse shifting. Thereby, the control arrangement can fine tune the switching instants so that a commutation-induced output current difference between the parallel-connected inverter legs towards zero, while the switching instants may otherwise be generated in a conventional manner.

Advantageously, the parallel inverter legs do not need to know about each other's currents or the differential current, but the balanced current sharing by adjusting boost current can be embodied relying only on information that is readily available separately in each of the parallel-connected legs, i.e. output current value (e.g., $I_{o1}$ or $I_{o2}$). The benefit of an autonomous (or distributed or decentralized) control stems from avoiding the need for information exchange between higher-level control and lower-level control entities or between the lower-level control entities, such as the switching controls $\mathbf{8}_1$ and $\mathbf{8}_2$. The autonomous control system is usually also simpler and more modular compared to a centralized one, thus it easier to understand and maintain. Further, to keep the implementation cost effective, it would be preferable that there would not be any extra requirements for component selection or communication needs between the parallel-connected inverter units, i.e., the normal "single inverter units", such as the inverters INV1 and INV2, could be parallel as such. The challenge on the other hand is obvious: the autonomous units must operate with a limited information. This challenge is overcome with embodiments of the present invention.

In a typical case the parallel-connected converter legs have similar nominal leg current ratings. In embodiments, the autonomous leg-specific switching instant adjustment of all parallel-connected converter legs have the same first predetermined dependence on the value of the sensed leg current of the respective converter leg in mode A commutation and a same second predetermined dependence in the mode B commutation.

However, the autonomous leg-specific switching instant adjustment of the invention can be applied also in a case the parallel connected phase legs have different nominal current ratings. In embodiments, predetermined first and second dependences of different parallel-connected converter legs having different nominal leg current ratings are selected to scale the current sharing between the between the parallel-connected converter legs according to nominal leg currents of the parallel-connected converter legs.

Let us examine an example of an autonomous leg-specific switching instant adjustment according to principles of the invention applied in an ARCP converter system, such as the system illustrated in FIG. 3. Generally, turn-on instants of the auxiliary switches and turn-off instants of the main switches are both shifted by a same amount, applicable both in mode A and mode B. This means that each ARCP commutation sequence is shifted as such in time. The amount of shifting is determined autonomously in the parallel connected legs 1 and 2, based on their respective leg output currents $I_{o1}$ and $I_{o2}$. The durations of boosting times and boosting current levels are not affected by the shifting due to the autonomous leg-specific switching instant adjustment according to the embodiments of the invention. It should be appreciated that the boosting currents might have been manipulated if some other control methods relying on such manipulation were applied simultaneously. The example presented herein assumes that both converter legs aim for identical boost currents, reference values for the boost currents being $I_{bA1,r1}=I_{bA,r2}$ for mode A, and $I_{bB,r1}=I_{bB,r2}$ for mode B.

FIGS. 8A-8C show an exemplary timing diagram that schematically illustrates the principle of the shifting for a single converter leg. In the illustrated timing diagram, FIG. 8A shows a PWM signal as providing commutation commands that are simultaneously applied to each of the parallel-connected converter legs to initiate the commutations. In the illustrated example, a leading (rising) edge of the incoming PWM signal initiates a Mode B commutation at the instant $t_{B0}$ and a trailing (falling) edge initiates a Mode A commutation the time instant $t_{A0}$. FIG. 8B shows schematically the timing of the auxiliary current $I_a$ of a single converter leg. For simplicity, the auxiliary current $I_a$ is shown only for the boosting periods $t_{bB}$ and $t_{bA}$. FIG. 8C shows schematically the timing of the capacitor voltage $V_{C2}$, i.e. the output voltage swing. Again, for simplicity, the swing times of the voltage $V_{C2}$ are reduced to zero. In the illustrated example the mode B commutation is advanced, and the mode A commutation is delayed in proportion to the sensed value of the output current $I_o$. The output current $I_o$ is assumed to be of negative polarity in FIGS. 8A-8B, but $I_o$ should be interpreted as the absolute value of $I_o$ as will be discussed in in equations below. Therefore, the polarity of the output current does not affect on the basic principles of the autonomous leg-specific switching instant adjustment method according to embodiments of the invention.

Let us assume that leg output current $I_o$ is positive, and that $I_{o1}>I_{o2}$ so that the differential output current $I_d>0$. In mode A, the turn-off instant $t_{offS21}$ of the lower main switch $S_{21}$ starts the voltage swing in the APCP inverter leg INV1 and the turn-off instant $t_{offS22}$ of the lower main switch $S_{22}$ starts the voltage swing in the APCP inverter leg INV2. In mode B, the turn-off instant of upper main switch $S_{11}$ starts the voltage swing in the APCP inverter leg INV1 and the turn-off instant $t_{offS12}$ of the lower main switch $S_{12}$ starts the voltage swing in the APCP inverter leg INV2.

In an exemplary embodiment, let us define the difference in the turn-off instants of the main switches in mode A as follows $$\Delta t_{S2} = t_{offS21} - t_{offS22} \tag{7}$$

In mode B the difference in the turn-off instants is defined as $$\Delta t_{S1} = t_{offS11} - t_{offS12} \tag{8}$$

where $t_{offS21}$ and $t_{offS22}$ are the turn-off instants in mode A for $S_{21}$ and $S_{22}$, respectively. Likewise, $t_{offS11}$ and $t_{offS12}$ are the turn-off instants in mode B for $S_{11}$ and $S_{12}$, respectively.

Allowing for the possibly unequal swing intervals $t_{sA1}$ and $t_{sA2}$ in mode A, the effective total timing difference during the commutation is $$\Delta t_A = -\left(\Delta t_{S2} + \frac{t_{sA1} - t_{sA2}}{2}\right) \tag{9}$$

Likewise, allowing for the possibly unequal swing intervals $t_{sB1}$ and $t_{sB2}$ in mode B, the effective total timing difference during the commutation is $$\Delta t_B = \Delta t_{S1} + \frac{t_{sB1} - t_{sB2}}{2} \tag{10}$$

Under the assumption of positive output current $I_o$, a positive $\Delta t_A$ or $\Delta t_B$ will increase the differential current $I_d=(I_{o1}-I_{o2})/2$ by $$\Delta I_{dA} = \frac{\Delta t_A U_{dc}}{L_d} \tag{11}$$

in mode A, and by $$\Delta I_{dB} = \frac{\Delta t_B U_{dc}}{L_d} \tag{12}$$

in mode B.

In mode A, if the converter leg INV1 turns off its lower switch $S_{21}$ later than the converter leg INV2 turns off its lower switch $S_{22}$, the difference $\Delta t_{S2}$ in the turn-off instants will be positive. Hence $\Delta t_A$ in the equation (9) will have a negative term, which will make the differential current $\Delta I_{dA}$ in the equation (11) definitely negative, provided the swing times $t_{sA1}$ and $t_{sA2}$ are equal (i.e. boost currents $I_{bA1}=I_{bA2}$, which practically means for the equivalent boost time intervals $t_{bA1}=t_{bA2}$).

If the whole commutation sequence from the turn-on of the auxiliary switch to the turn-off of the main switch in mode A is adjusted to happen later in the converter leg that has higher output current value, the differential current $\Delta I_{dA}$ will be decreased. To achieve this desired behavior, the turn-on instants $t_{onSa1}$ of the auxiliary switches $S_{a1}$ can be delayed from the instant $t_{A0}$ in both legs by individual variable increments or timesteps $$t_{wA1} = k_A|I_{o1}| \tag{13}$$

and $$t_{wA2} = k_A|I_{o2}|. \tag{14}$$

The boosting times $t_{bA1}$ and $t_{bA2}$ are not altered. The factor proportional control gain $k_A$ is a design parameter (a positive constant) that should be equal for both legs if their nominal current ratings are equal. In order to shift the whole commutation sequence in time, the reference values for turn-off instants of $S_{21}$ and $S_{22}$ will be delayed as well by individual variable increments or timesteps $t_{wA1}$ and $t_{wA2}$.

$$t_{offS21,r} = t_{wA1} + t_{bA,r} \tag{15}$$

$$t_{offS22,r} = t_{wA2} + t_{bA,r} \tag{16}$$

where it is assumed that the reference boosting times $t_{bA,r}$ (and the corresponding reference boosting currents $I_{bA,r}$) are equal in the legs.

Since $|I_{o1}|>|I_{o2}|$, the autonomous leg-specific switching instant adjustment method makes the lower switch $S_{21}$ in the converter leg INV1 turn off later than the lower switch $S_{22}$ in the converter leg INV2

$$\Delta k_{S2,r} = t_{offS21,r} - t_{offS22,r} = k_A(|I_{o1}| - |I_{o2}|) \tag{17}$$

This way a term $k_A(|I_{o1}|-|I_{o2}|)$ will be added to the difference $\Delta t_{S2}$ in the turn-off instants of the main switches, which tends to make the difference $\Delta t_{S2}$ more positive (since $|I_{o1}|>|I_{o2}|$), thereby reducing the differential current $I_d$. In embodiments, the factor $k_A$ may conveniently have units in [ns/A] and may perhaps attain a value of 0.5 . . . 2, so that a differential current of 50 A, for example, would make a 50 ns . . . 200 ns change in the timing difference $\Delta t_{S2}$.

Similar reasoning can be applied to mode B, but now the converter leg with higher current must shift its commutation sequence earlier in time. Because the incoming PWM edge that provides the command to start commutation cannot be advanced in time, the incoming PWM edge is, in embodiments, first conceptually "delayed" by a constant time $t_c$ from the instant $t_{B0}$ for both converter legs. Thereby an adjustment range is provided to allow advancing in time from this "delayed" command. In embodiments, in each parallel-connected converter leg, the turn-on instant $t_{onSa2}$ of the auxiliary switch $S_{a2}$ will happen after a variable waiting interval or time step $t_{wB}$ from the incoming PWM edge (the instant $t_{B0}$) according to $$t_{wB} = t_c - k_B|I_{o1}| \tag{18}$$

where $k_B$ is the advancement factor (a positive constant). The turn-off instant $t_{offS1}$ of the upper main switch $S_1$ is $$t_{offS1} = t_{wB} + t_{bB} \tag{19}$$

As the output current $I_o$ gets higher, the waiting interval $t_{wB}$ gets smaller, and because the boosting time $t_{bB}$ is not altered, the turn-off instant $t_{offS1}$ will get advanced in time, which was the goal.

In the illustrated example, the parallel connected legs INV1 and INV2 would accordingly calculate their respective waiting times to be $$t_{wB1} = t_c - k_B|I_{o1}| \tag{20}$$

and $$t_{wB2} = t_c - k_B|I_{o2}| \tag{21}$$

so that the reference values for turn-off instants for the switches $S_{11}$ and $S_{12}$ will be $$t_{offS11,r} = t_{wB1} + t_{bB,r} \tag{22}$$

and $$t_{offS12,r} = t_{wB2} + t_{bB,r} \tag{23}$$

where it is assumed that the reference boosting times $t_{bB,r}$ (and the reference boosting currents $I_{bB,r}$) are equal in the legs.

Since $|I_{o1}|>|I_{o2}|$, the autonomous leg-specific switching instant adjustment method makes the upper switch $S_{11}$ in the converter leg INV1 turn off earlier than the upper switch $S_{12}$ in the converter leg INV2:

$$\Delta t_{S1,r} = t_{offS11,r} - t_{offS12,r} = -k_B(|I_{o1}| - |I_{o2}|) \tag{24}$$

Figure 9A:
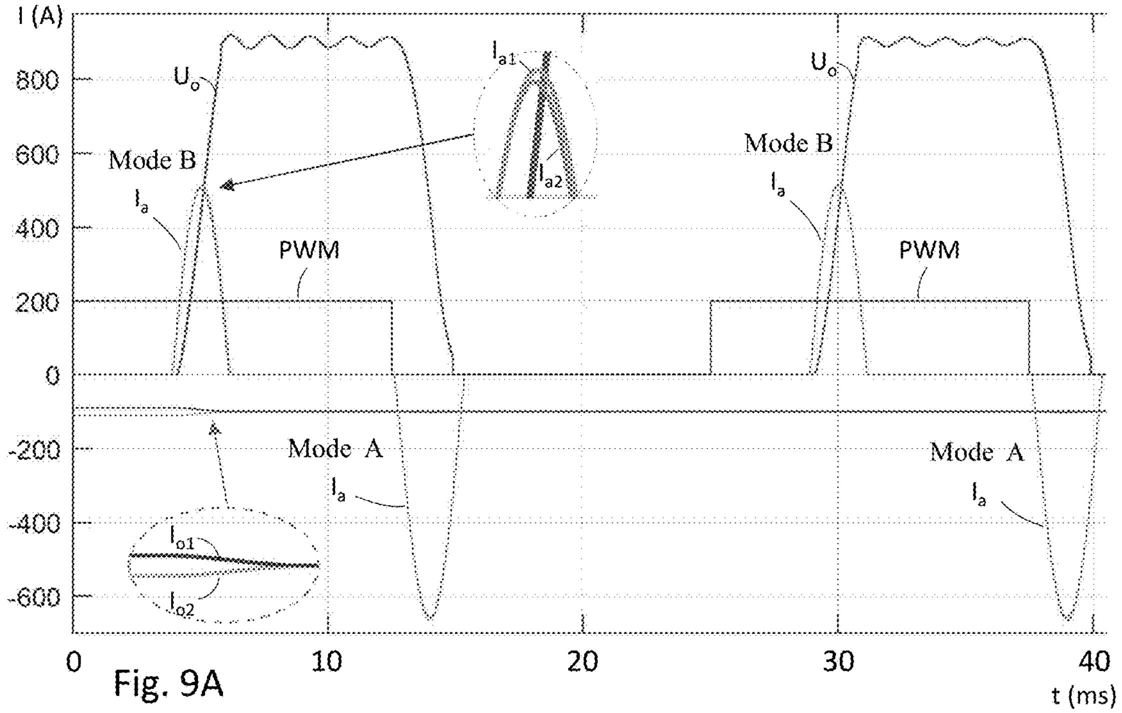
FIGS. 9A and 9B show timing diagrams illustrating a simulated operation of the method according to embodiments of the invention for negative output current.
Figure 9B:
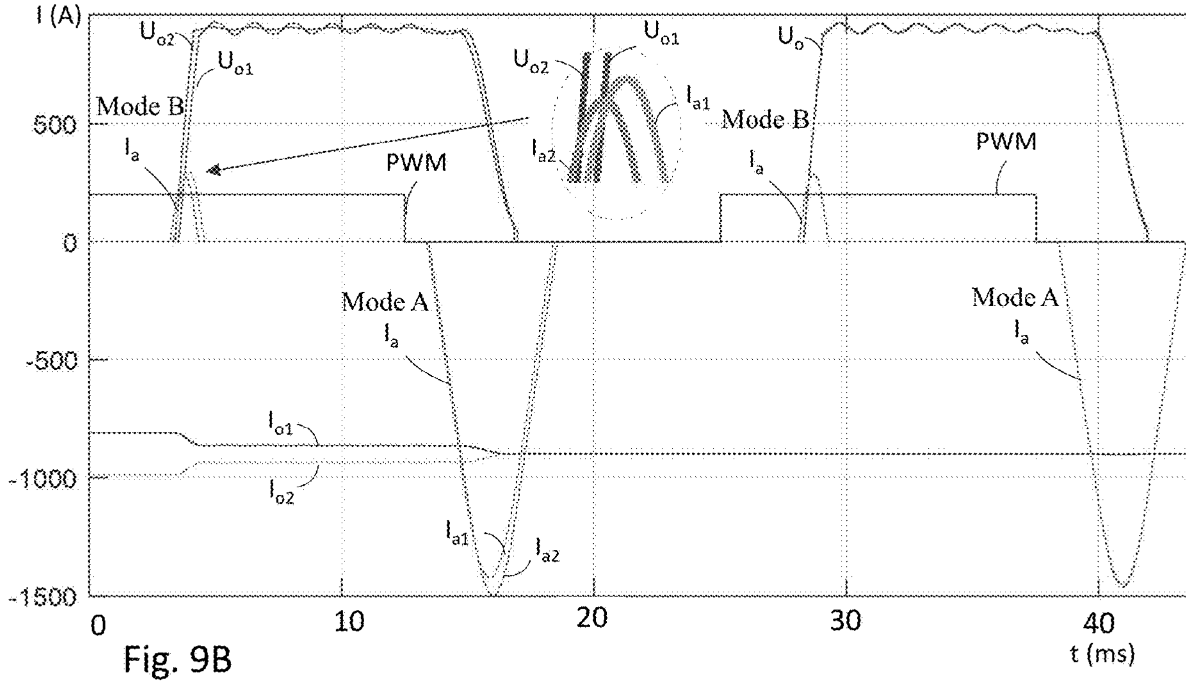

FIGS. 9A and 9B show timing diagrams for exemplary simulations that illustrate the operation of the autonomous leg-specific switching instant adjustment method according to embodiments of the invention for negative output current $I_o$. The bottom traces $I_{o1}$ and $I_{o2}$ that converge close to each other represent the output currents of the parallel converter legs. Factors $k_A$ and $k_B$ in equations (13)-(14) and (20)-(21) were set at 1 ns/A. The square-wave signal PWM represents an incoming PWM command and the higher amplitude sloping signals represent a leg output voltage $U_o$ referenced to the N potential. Note that the effective voltage pulse length of $U_0$ increases as the total output current increases. This is a drawback of the method as it will cause current-dependent distortion, which, however, can be compensated with state-of-the art methods. FIGS. 9A and 9B also illustrate a behavior of the auxiliary current $I_a$ in modes A and B. Auxiliary current pulses $I_a$ are positive for mode B and negative for mode A.

In FIG. 9A, the total output current $I_o=I_{o1}+I_{o2}$ of the parallel-connected converter legs was −200 A, but it was initially shared unevenly between the converter legs INV1 and INV2, the leg output current $I_{o1}$ of the leg INV1 being −90 A and the leg output current $I_{o2}$ of the leg INV2 being −110 A. When the output current is relatively low in FIG. 9A, the auxiliary current $I_a$ is large in mode B and small in mode A. Since $|I_{o2}|>|I_{o1}|$, the method causes the mode B commutation of the leg INV2 to start earlier than the leg INV1, and thereby the auxiliary current $I_{a2}$ of the leg INV2 and the output voltage swing $U_o$ are started (i.e. the main switch $S_2$ turned off) slightly earlier than the $I_{a1}$ and the $U_o$ of the leg INV1. As a result, the output currents $I_{o1}$ and $I_{o2}$ converge towards each other and are aligned already after mode B commutation, as illustrated in FIG. 9A. In an ideal case, when the output currents $I_{o1}$ and $I_{o2}$ are now equal, also the auxiliary currents and the output voltage swings of the parallel-connected legs are now approximately aligned in subsequent commutations.

In FIG. 9B, the total output current $I_o=I_{o1}+I_{o2}$ of the parallel-connected converter legs was −1800 A, but it was initially shared unevenly between the converter legs INV1 and INV2, the leg output current $I_{o1}$ of the leg INV1 being −720 A and the leg output current $I_{o2}$ of the leg INV2 being −980 A. As the output current increases in FIG. 9B as compared with FIG. 9A, the auxiliary current $I_a$ decreases in mode B and increases in mode A. In mode B, the output current speeds up the voltage swing in the resonant capacitors, hence there is less time for the auxiliary current to develop in the resonant inductor at higher output currents. In mode A, the auxiliary current must always be larger than the output current before the output voltage swing can start (i.e., main switch $S_2$ is turned off.) In FIG. 9B, since $|I_{o2}|>|I_{o1}|$, the method causes the mode B commutation of the leg INV2 to start earlier than the leg INV1, and thereby the auxiliary current $I_{a2}$ of the leg INV2 and the output voltage swing $U_o$ are started (i.e. the main switch $S_2$ turned off) earlier than the $I_{a1}$ and the $U_o$ of the leg INV1. As a result, although the output currents $I_{o1}$ and $I_{o2}$ converge towards each other during the first mode B commutation, they are still unequal, as illustrated in FIG. 9A. In the subsequent mode A commutation, as $|I_{o2}|>|I_{o1}|$, the method causes the mode A commutation of the leg INV2 to start later than the leg INV1, and thereby the auxiliary current $I_{a2}$ of the leg INV2 and the output voltage swing $U_o$ are started (i.e. the main switch $S_2$ turned off) later than the $I_{a1}$ and the $U_o$ of the leg INV1. Now, the output currents $I_{o1}$ and $I_{o2}$ converge towards each other and are aligned during mode B commutation, as illustrated in FIG. 9B. In an ideal case, the output currents $I_{o1}$ and $I_{o2}$ as well as the auxiliary currents and the output voltage swings of the parallel-connected legs are now approximately aligned in subsequent commutations.

The autonomous leg-specific switching instant adjustment method can be applied to parallel connected hard-switching (HS) converter legs, such as the HS legs shown in FIG. 2. In that case, the mode A corresponds to a turn-on of a main switch that will start conducting (the current is commutated from a diode to the switch), and the mode B corresponds to turn-off of a switch that has been conducting (the current is commutated from the switch to a diode).

Let us examine exemplary cases for balance a current sharing between the parallel-connected HS inverter legs shown in FIG. 2 according to embodiments of the invention.

First, an exemplary commutation from the upper dc-rail 22 ($U_{DC+}$) to the lower dc-rail 24 ($U_{DC-}$), i.e. the turn-off sequence of the upper main switch $S_{11}$ and turning on the lower main switch $S_{21}$ in INV1 and respectively the turn-off sequence of the upper main switch $S_{12}$ and turning on the lower main switch $S_{22}$ in INV2 is described:

HS1) The upper switch $S_{11}$ respectively $S_{12}$ is on and the leg output 110 is connected to the upper dc-rail 22 ($U_{DC+}$).

HS1.pos) If the current is positive, $I_o>0$, the upper switch $S_{11}$ respectively $S_{12}$ carries the current and the turn-off event is similar to a Mode B (from the switch to a diode) commutation in the ARCP converter:

a) Similar to the ARCP mode B commutation, the converter leg with higher current must shift its commutation sequence earlier in time. Because the incoming PWM edge that provides the command to start commutation cannot be advanced in time, the incoming PWM edge is, in embodiments, first conceptually "delayed" by a constant time $t_c$ from the instant $t_{B0}$ for both converter legs. Thereby an adjustment range is provided to allow advancing in time from this "delayed" command, i.e. the total delay decreases with the increasing leg output current. According to embodiments, the turn-off event of the upper switch $S_{11}$ respectively $S_{12}$ is advanced by a variable timestep $t_{d,off}=t_c-k_{off}*|I_o|$, where $k_{off}$ is the advancement factor (a positive constant) corresponding to the $K_{B1}$ in the ARCP mode B.

b) The output current $I_{o1}$ respectively $I_{o2}$ commutates to the lower diode $D_{21}$ respectively $D_{22}$.

c) In embodiments, the lower main switch $S_{21}$ respectively $S_{22}$ may be turned on after a predetermined turn-on delay $t_D$, which is typically used in the art to prevent simultaneous conducting of upper and lower switches, i.e. to avoid DC-link short, in hard-switching converters.

d) The leg output 110 is connected to the lower dc-rail 24 ($U_{DC-}$).

HS1.pos) If the current is negative, $I_o<0$, the upper diode $D_{11}$ respectively $D_{12}$ carries the current $I_{o1}$ respectively $I_{o2}$ and the turn-off event is similar to Mode A (from diode to switch) commutation in the ARCP converter:

a) According to embodiments, the turn-off event of upper switch $S_{11}$ respectively $S_{12}$ is not delayed at all, it can happen immediately. The upper diode $D_{21}$ respectively $D_{22}$ remains conducting.

b) Similar to the ARCP mode A commutation, the commutation is delayed in proportion to the sensed value of the output current $I_{o1}$ respectively $I_{o2}$ of the leg. In embodiments, the turn-on event of the lower switch $S_{21}$ respectively $S_{22}$ is delayed by a variable timestep $t_{d,on}=t_D+K_{on}*|I_o|$, where $t_D$ is the predetermined turn-on delay and $K_{on}$ is a factor proportional control gain (a positive constant) corresponding to $k_A$ in the ARCP mode A.

c) The current $I_{o1}$ respectively $I_{02}$ commutates to lower switch $S_{21}$ respectively $S_{22}$ and the leg output 110 is connected to the lower dc-rail 24 ($U_{DC-}$).

Similarly, commutation from the lower dc-rail 24 ($U_{DC-}$) to the upper dc-rail 22 ($U_{DC+}$), turn-off sequence of the lower switch $S_{21}$ respectively $S_{22}$ and turning on the upper switch $S_{11}$ respectively $S_{12}$:

HS2) The lower switch $S_{21}$ is on in the leg INV1 and respectively the lower switch $S_{22}$ is on in the leg INV2 and the leg output 110 is connected to the lower dc-rail 24 ($U_{DC-}$) in each leg.

HS2.pos) If the current is positive, $I_o>0$, the lower diode $D_{21}$ respectively $D_{22}$ carries the current and the turn-off event is similar to Mode A (from diode to switch) commutation in the ARCP converter:

a) According to embodiments, the turn-off event of lower switch $S_{21}$ respectively $S_{22}$ is not delayed at all, it can happen immediately. The lower diode $D_{21}$ respectively $D_{22}$ remains conducting.

b) Similar to the ARCP mode A commutation, the commutation is delayed in proportion to the sensed value of the output current $I_{o1}$ respectively $I_{o2}$ of the leg. In embodiments, The turn-on event of the upper switch $S_{11}$ respectively $S_{12}$ is delayed by a variable timestep $t_{d,on}=t_D+k_{on}*|I_o|$, where $t_D$ is the predetermined turn-on delay and $k_{on}$ is a factor proportional control gain (a positive constant) corresponding to $k_A$ in the ARCP mode A.

c) The current $I_{o1}$ respectively $I_{o2}$ commutates to upper switch $S_{11}$ respectively $S_{12}$ and the leg output 110 is connected to the upper dc-rail 22 ($U_{DC+}$).

HS2.neg) If the current is negative, $I_o<0$, the lower switch $S_{21}$ respectively $S_{22}$ carries the current and the turn-off event is similar to Mode B (from switch to diode) commutation in the ARCPI converter:

a) Similar to the ARCP mode B commutation, the converter leg with higher current must shift its commutation sequence earlier in time. In embodiments, the turn-off event of lower switch $S_{21}$ respectively $S_{22}$ is delayed by a variable timestep $t_{d,off}=t_c-k_{off}*|I_o|$, where, $t_c$ is the constant delay time for both converter legs from the incoming PWM edge that provides the command to start commutation, similar to instant $t_{B0}$ in case of ARCP, and $k_{off}$ is the advancement factor (a positive constant) corresponding to the $k_{B1}$ in the ARCP mode B.

b) The current $I_{o1}$ respectively $I_{o2}$ commutates to the upper diode $D_{11}$ respectively $D_{12}$.

c) Upper switch $S_{11}$ respectively $S_{12}$ is turned on after a predetermined turn-on delay $t_D$, which is typically used to prevent simultaneous conducting of upper and lower switches, i.e. to avoid DC-link short, in hard-switching converters.

d) The leg output 110 is connected to the upper dc-rail 22 ($U_{DC+}$).

The autonomous leg-specific switching instant adjustment according to the invention can be applied also in a case the parallel connected phase legs having different nominal current ratings. Due to thermal and economic reasons, it is of utmost importance that the legs are loaded as close to their respective nominal ratings as possible.

In case of different nominal ratings, $I_{N1}$ and $I_{N2}$, the desired current share should be $$\frac{I_{o1}}{I_{o2}} = \frac{I_{N1}}{I_{N2}} \text{ or } \frac{I_{o1}}{I_{N1}} = \frac{I_{o2}}{I_{N2}}$$

Let us denote the ratio $I_{o1}/I_{N1}$ by $r_1$ and the ratio $I_{o2}/I_{N2}$ by $r_2$. Because $I_{o1}$ and $I_{o2}$ are time-varying quantities (typically sinusoidal), the ratios $r_1$ and $r_2$ are also time-varying. In an ideal current sharing, obviously $r_1=r_2$.

Let us examine connecting ARCP converter legs of different nominal current ratings in parallel. In mode B, the load current $I_o$ is participating in the voltage swing in charging and discharging the resonant capacitors $C_{11}$ and $C_{12}$. This feature provides a natural current balancing mechanism in parallel connected ARCP legs, because the leg with higher ratio r will have a faster voltage swing, which tends to make the difference $r_1-r_2$ smaller in value. It can be shown that the natural balancing in mode B tends to make the voltage swing slopes in the parallel ARCP legs identical during the commutation. (Provided that there are no deviations in the turn-off instants of the main switches.)

Let us assume the resonant capacitances $C_{11}/C_{21}$ and $C_{12}/C_{22}$ of the converter legs INV1 and INV2 are substantially different, e.g. 1 μF in total in the leg INV1, but only 500 nF in total in the leg INV2. This would be the case if the leg INV1 was dimensioned for twice the nominal current of the leg INV2 so that $I_{N1}=2I_{N2}$. Accordingly, the resonant inductance $L_1$ in the leg INV1 would be dimensioned to be one half the resonant inductance $L_2$ in the leg INV2, so that the resonant frequencies in both legs would be equal. It will turn out that under such circumstances the leg INV1 tends to have twice the output current of the leg INV1. Otherwise, the voltage slopes would not be identical. Under these conditions, mode B forces the parallel-connected legs towards sharing their currents in a ratio of 2:1. This takes place without any control, it is just a natural feature of the circuit. Deviations in timing and elsewhere act against this ideal situation, but the effect is quite strong.

In embodiments, the factors $k_A$ and $k_B$ in equations (13), (14) and (20), (21) are selected to scale with the nominal current in both legs INV1 and INV2 according to $k_{A1}I_{N1}=k_{A2}I_{N2}$ and $k_{B1}I_{N1}=k_{B2}I_{N2}$, where $k_{A1}$ and $k_{B1}$ are factors and $I_{N1}$ is the nominal current of the leg INV1, and $k_{A2}$ and $k_{B2}$ are factors and $I_{N2}$ is the nominal current of the leg INV2. The scaling can be applied to any number of parallel legs. In the special case where the parallel-connected converter legs have equal nominal leg currents, i.e. $I_{N1}=I_{N2} \ldots =I_{NN}$, also the factors $k_A$ and $k_B$ are equal for all converter legs, i.e. $k_{A1}=k_{A2} \ldots =k_{AN}$ and $k_{B1}=k_{B2} \ldots =k_{BN}$.

Figure 10:
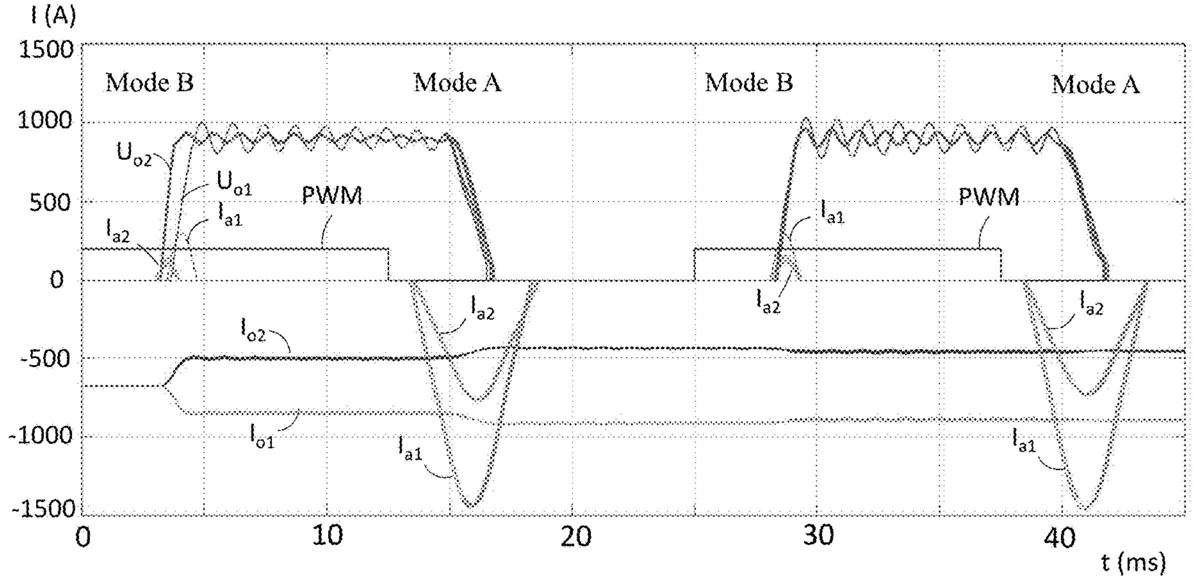
FIG. 10 shows a timing diagram illustrating an exemplary simulation for two parallel-connected ARCP converter legs dimensioned for nominal currents in ratio 2:1.

FIG. 10 shows a timing diagram for an exemplary simulation that illustrates a situation, where two ARCP converter legs dimensioned for nominal currents in ratio 2:1 are connected in parallel. The dimensions for the ARCP leg INV1 were $C_{11}=C_{21}=500$ nF, $L_1=625$ nH, $k_{A1}=1$, $k_{B1}=1$, $L_{o1}=625$ nH, $I_{bA,r1}=I_{bB,r1}=150$ A. The dimensions for the ARCP leg INV2 were $C_{12}=C_{22}=250$ nF, $L_2=1250$ nH, $k_{A2}=2$, $k_{B2}=2$, $L_{o2}=1250$ nH, $I_{bA,r2}=I_{bB,r2}=75$ A. Thus, the targeted current sharing between the converter legs was 2:1. The autonomous current balancing was applied for both converter legs INV1 and INV2. Total output current is −1350 A, initially shared evenly −675 A and −675 A. Furthermore, the main switch turn-off instants were delayed 50 ns in the leg INV2, and auxiliary switch turn-on instants were delayed 100 ns in the leg INV2 in the simulation to show the balancing algorithm effectiveness in case of practical non-idealities. The initial condition had equal current sharing, which was wildly off the target as the leg INV1 should take −900 A and the leg INV2 should take −450 A. Two carrier periods in this simulation were enough to pull the leg output currents $I_{o1}$ and $I_{o2}$ very close to the desired values. This happens despite the errors introduced in the switching instants and mismatch of the main switch and diode characteristics.

Similarly, the autonomous leg-specific switching instant adjustment according to the invention can be applied also in a case the parallel connected hard-switching converter legs having different nominal current ratings. In embodiments, the factors $k_{on}$ or $k_{off}$ in the parallel-connected hard-switching legs are selected to scale with nominal leg currents $I_{N1}$ and $I_{N2}$ of the converter legs INV1 and INV2 such that a product of the constant $k_{on}$ and the nominal leg current $I_N$ is same in both parallel-connected converter legs and a product of the constant $k_{off}$ and the nominal leg current $I_N$ is same in both parallel-connected converter legs, i.e. $k_{on1}I_{N1}=k_{on2}I_{N2}$ and $k_{off1}I_{N1}=k_{off2}I_{N2}$. The scaling can be applied to any number of parallel legs. In the special case where the parallel-connected converter legs have equal nominal leg currents, i.e. $I_{N1}=I_{N2} \ldots =I_{NN}$, also the factors $k_{on}$ and $k_{off}$ are equal for all converter legs, i.e. $k_{on1}=k_{on2} \ldots =k_{onN}$ and $k_{off1}=k_{off2} \ldots =k_{offN}$.

The switching control and current sharing techniques described herein may be implemented by various means. For example, these techniques may be implemented in hardware (one or more devices), firmware (one or more devices), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) and executed by one or more processors/computers. The data storage medium or the memory unit may be implemented within the processor/computer or external to the processor/computer, in which case it can be communicatively coupled to the processor/computer via various means as is known in the art. Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

The description and the related drawings are only intended to illustrate the principles of the present invention by means of examples. Various alternative embodiments, variations and changes are obvious to a person skilled in the art on the basis of this description. The present invention is not intended to be limited to the examples described herein but the invention may vary within the scope and spirit of the appended claims.

The invention claimed is:

1. A power converter system, comprising two or more converter legs connected in parallel between a common dc system and a common ac system or between two common dc systems, wherein each of said converter legs includes a first controllable main switching device with a first antiparallel diode and a second controllable main switching device with a second antiparallel diode connected in series between a first DC voltage rail and a second DC voltage rail to alternatively connect the first and second dc-link rails to a converter leg output or input, wherein each parallel-connected converter leg includes a mode A of commutation wherein a leg current commutates from the first or second antiparallel diode to the second or first controllable main switching device, respectively, and a mode B of commutation wherein the leg current commutates from the first or second controllable main switching device to the second or first antiparallel diode, respectively, wherein commutations of the parallel-connected converter legs are initiated by essentially simultaneous commutation commands, a control arrangement configured to sense a leg current in each of the parallel-connected converter legs, and wherein the control arrangement is configured to balance a current sharing between the parallel-connected converter legs by means of having an individual autonomous leg-specific switching instant adjustment for the controllable main switching devices of each of the parallel-connected converter legs to shift the mode A commutation of a respective converter leg later in time and to shift the mode B commutation of the respective converter leg earlier in time by a variable timestep proportional to a value of a sensed leg current of the respective converter leg.

2. The power converter system as claimed in claim 1, wherein the individual autonomous leg-specific switching instant adjustment of each of the parallel-connected converter legs is configured to shift a start of a leg voltage swing during the mode A commutation of the respective converter leg later in time and to shift a start of a leg voltage swing during the mode B commutation of the respective converter leg earlier in time by a variable timestep proportional to the value of the sensed leg current of the respective converter leg.

3. The power converter system as claimed in claim 1, wherein a size of the variable timestep of an individual shift later in time during an individual mode A commutation and a size of the variable timestep of an individual shift earlier in time during an individual mode B commutation are configured to be dependent on the value of the sensed leg current of the respective converter leg in such a way that the size of the variable timestep increases with an increasing value of the sensed leg current and decreases with a decreasing value of the sensed leg current.

4. The power converter system as claimed in claim 1, wherein the individual autonomous leg-specific switching instant adjustment of each of the parallel-connected converter legs for the main switching devices has a first predetermined dependence on the value of the sensed leg current of the respective converter leg in the mode A commutation and a second predetermined dependence in the mode B commutation.

5. The power converter system as claimed in claim 1, wherein the parallel-connected converter legs are auxiliary resonant commutated pole (ARCP) converter legs and wherein the control arrangement is configured to advance a mode B commutation sequence for each parallel-connected converter leg and delay a mode A commutation sequence for each parallel-connected converter leg in time in such a way that a size of the variable timestep increases with an increasing value of the sensed leg current and decreases with a decreasing value of the sensed leg current of the respective converter leg.

6. The power converter system as claimed in claim 5, wherein an ARCP commutation sequence includes a sequence from a turn-on instant of at least one auxiliary switching device to a turn-off instant of a main switching device that has been conducting.

7. The power converter system as claimed in claim 5, wherein the control arrangement is configured to delay both a turn-on instant of at least one auxiliary switching device and a turn-off instant of a main switching device in the mode A commutation by a first variable timestep $t_{wA}$ which increases with an increasing value of the sensed leg current and decreases with a decreasing value of the sensed leg current of the respective converter leg, and wherein the control arrangement is configured to delay both a turn-on instant of the at least one auxiliary switching device and a turn-off instant of a main switching device in the mode B commutation by a second variable timestep $t_{wB}$ which decreases with the increasing value of the sensed leg current and increases with the decreasing value of the sensed leg current of the respective converter leg, thereby advancing the turn-off instant of the main switching device proportionally to the value of the sensed leg current.

8. The power converter system as claimed in claim 7, wherein the control arrangement is configured to delay the turn-off instant of the main switching device in the mode A commutation by adding the first variable timestep $t_{wA}$ to a reference turn-off instant of the main switching device, and wherein the control arrangement is configured to advance the turn-off instant of the main switching device in the mode B commutation by adding the second variable timestep $t_{wB}$ to a reference turn-off instant of the main switching device.

9. The power converter system as claimed in claim 7, wherein the first variable timestep is $t_{wA}=k_A|Io|$, where $I_o$ is a value of a sensed leg current of the respective converter leg, and $k_A$ is a constant, $k_A$ being equal for the parallel-connected converter legs having equal nominal leg current ratings, and wherein the second variable timestep is $t_{wB}=t_c-k_B|Io|$, where $t_{wB}\geq 0$, $I_o$ is a value of the sensed leg current of the respective converter leg, $t_c$ is a constant time, and $k_B$ is a constant, $k_B$ being equal for the parallel-connected converter legs having equal nominal leg current ratings.

10. The power converter system as claimed in claim 9, wherein the parallel-connected converter legs have respective different nominal leg current ratings, and wherein the constants $k_A$ and/or $k_B$ in the parallel-connected converter legs are selected to scale with respective nominal leg currents of the converter legs such that a product of the constant $k_A$ and a nominal leg current $I_N$ is the same in all of the parallel-connected converter legs and a product of the constant $k_B$ and the nominal leg current $I_N$ is essentially the same in all of the parallel-connected converter legs.

11. The power converter system as claimed in claim 1, wherein the parallel connected converter legs are hard-switching converter legs and wherein the control arrangement is configured to delay a turn-off instant of a main switching device that has been conducting in the mode B commutation by a first variable timestep $t_{d,off}$ which decreases with an increasing value of the sensed leg current and increases with a decreasing value of the sensed leg current of the respective converter leg, and wherein the control arrangement is configured to delay a turn-on instant of a main switching device that will start conducting in the mode A commutation by a second variable timestep $t_{d,on}$ which increases with the increasing value of the sensed leg current and decreases with the decreasing value of the sensed leg current of the respective converter leg.

12. The power converter system as claimed in claim 11, wherein the first variable timestep $t_{d,off}$ decreases with the increasing value of the sensed leg current according to $K_{off}*|Io|$, where $I_o$ is a value of the sensed leg current of the respective converter leg and $k_{off}$ is a constant, $k_{off}$ being equal for the parallel-connected converter legs having equal nominal leg current ratings, and wherein the second variable timestep $t_{d,on}$ increases with the increasing value of the sensed leg current according to $k_{on}*|Io|$, where $I_o$ is a value of the sensed leg current of the respective converter leg, and Kon is a constant, $k_{on}$ being equal for the parallel-connected converter legs having equal nominal leg current ratings.

13. The power converter system as claimed in claim 11, wherein the first variable timestep is $t_{d,off}=t_c-k_{off}|Io|$, where $t_c$ is a constant time defining an adjustment range, and wherein the second variable timestep is $t_{d,on}=t_D+k_{on}|Io|$, where $t_D$ is a constant turn-on delay to avoid simultaneously conducting main switch devices.

14. The power converter system as claimed in claim 12, wherein the parallel connected converter legs have respective different nominal leg current ratings, and wherein the constants $k_{on}$ or $k_{off}$ in the parallel-connected converter legs are selected to scale with respective nominal leg currents of the converter legs such that a product of the constant $k_o$n and a nominal leg current $I_N$ is the same in all of the parallel-connected converter legs and a product of the constant $k_{off}$ and the nominal leg current $I_N$ is the same in all of the parallel-connected converter legs.

15. The power converter system as claimed in claim 1, wherein the control arrangement comprises a leg-specific controller for each of the two or more parallel-connected converter legs to adjust switching instants of the main switching devices.

16. The power converter system as claimed in claim 1, wherein the power converter system comprises two or more converters, each of the converters having one or more converter phase legs, wherein the parallel-connected converter legs are respective corresponding converter phase legs of the two or more converters connected in parallel.

17. The power converter system as claimed in claim 16, wherein the control arrangement comprises converter-specific switching controllers for the two or more converters, each of the converter-specific switching controllers being configured to provide the autonomous leg-specific switching instant adjustment for switching instants for each of the converter phase legs of a respective converter.

18. A power converter system, comprising two or more converter legs connected in parallel between a common dc system and a common ac system or between two common dc systems, wherein each of said converter legs includes a first controllable main switching device with a first antiparallel diode and a second controllable main switching device with a second antiparallel diode connected in series between a first DC voltage rail and a second DC voltage rail to alternatively connect the first and second dc-link rails to a converter leg output or input, wherein each parallel-connected converter leg includes a mode A of commutation wherein a leg current commutates from the first or second antiparallel diode to the second or first controllable main switching device, respectively, and a mode B of commutation wherein the leg current commutates from the first or second controllable main switching device to the second or first antiparallel diode, respectively, wherein commutations of the parallel-connected converter legs are initiated by essentially simultaneous commutation commands, a control arrangement configured to sense a leg current in each of the parallel-connected converter legs, and wherein the control arrangement is configured to balance a current sharing between the parallel-connected converter legs by means of having an individual autonomous leg-specific switching instant adjustment for the controllable main switching devices of each of the parallel-connected converter legs to shift the mode A commutation of a respective converter leg later in time and to shift the mode B commutation of the respective converter leg earlier in time by a variable timestep proportional to a value of a sensed leg current of the respective converter leg;

wherein the parallel-connected converter legs are auxiliary resonant commutated pole (ARCP) converter legs and wherein the control arrangement is configured to advance a mode B commutation sequence for each parallel-connected converter leg and delay a mode A commutation sequence for each parallel-connected converter leg in time in such a way that a size of the variable timestep increases with an increasing value of the sensed leg current and decreases with a decreasing value of the sensed leg current of the respective converter leg; and wherein the control arrangement is configured to delay both a turn-on instant of at least one auxiliary switching device and a turn-off instant of a main switching device in the mode A commutation by a first variable timestep $t_{wA}$ which increases with an increasing value of the sensed leg current and decreases with a decreasing value of the sensed leg current of the respective converter leg, and wherein the control arrangement is configured to delay both a turn-on instant of the at least one auxiliary switching device and a turn-off instant of a main switching device in the mode B commutation by a second variable timestep $t_{wB}$ which decreases with the increasing value of the sensed leg current and increases with the decreasing value of the sensed leg current of the respective converter leg, thereby advancing the turn-off instant of the main switching device proportionally to the value of the sensed leg current.

19. A power converter system, comprising two or more converter legs connected in parallel between a common dc system and a common ac system or between two common dc systems, wherein each of said converter legs includes a first controllable main switching device with a first antiparallel diode and a second controllable main switching device with a second antiparallel diode connected in series between a first DC voltage rail and a second DC voltage rail to alternatively connect the first and second dc-link rails to a converter leg output or input, wherein each parallel-connected converter leg includes a mode A of commutation wherein a leg current commutates from the first or second antiparallel diode to the second or first controllable main switching device, respectively, and a mode B of commutation wherein the leg current commutates from the first or second controllable main switching device to the second or first antiparallel diode, respectively, wherein commutations of the parallel-connected converter legs are initiated by essentially simultaneous commutation commands, a control arrangement configured to sense a leg current in each of the parallel-connected converter legs, and wherein the control arrangement is configured to balance a current sharing between the parallel-connected converter legs by means of having an individual autonomous leg-specific switching instant adjustment for the controllable main switching devices of each of the parallel-connected converter legs to shift the mode A commutation of a respective converter leg later in time and to shift the mode B commutation of the respective converter leg earlier in time by a variable timestep proportional to a value of a sensed leg current of the respective converter leg;

wherein the parallel connected converter legs are hard-switching converter legs and wherein the control arrangement is configured to delay a turn-off instant of a main switching device that has been conducting in the mode B commutation by a first variable timestep $t_{d,off}$ which decreases with an increasing value of the sensed leg current and increases with a decreasing value of the sensed leg current of the respective converter leg, and wherein the control arrangement is configured to delay a turn-on instant of a main switching device that will start conducting in the mode A commutation by a second variable timestep $t_{d,on}$ which increases with the increasing value of the sensed leg current and decreases with the decreasing value of the sensed leg current of the respective converter leg; and wherein the first variable timestep $t_{d,off}$ decreases with the increasing value of the sensed leg current according to $k_{off}*|Io|$, where $I_o$ is a value of the sensed leg current of the respective converter leg and $k_{off}$ is a constant, $k_{off}$ being equal for the parallel-connected converter legs having equal nominal leg current ratings, and wherein the second variable timestep $t_{d,on}$ increases with the increasing value of the sensed leg current according to $k_{on}*|Io|$, where $I_o$ is a value of the sensed leg current of the respective converter leg, and $k_{on}$ is a constant, $k_{on}$ being equal for the parallel-connected converter legs having equal nominal leg current ratings.

* * * * *